(12) United States Patent
Chlytchkov

(10) Patent No.: US 7,065,638 B1
(45) Date of Patent: Jun. 20, 2006

(54) TABLE-DRIVEN HARDWARE CONTROL SYSTEM

(75) Inventor: Alexei A. Chlytchkov, Santa Clara, CA (US)

(73) Assignee: Silicon Motion, Inc., San Jose, CA (US)

( * ) Notice: Subject to any disclaimer, the term of this patent is extended or adjusted under 35 U.S.C. 154(b) by 564 days.

(21) Appl. No.: 10/191,910

(22) Filed: Jul. 8, 2002

(51) Int. Cl.
*G06F 9/00* (2006.01)
*G06F 9/445* (2006.01)

(52) U.S. Cl. .............................. 713/1; 713/2
(58) Field of Classification Search .............. 713/1
See application file for complete search history.

(56) References Cited

U.S. PATENT DOCUMENTS

| | | | |
|---|---|---|---|
| 4,200,913 A * | 4/1980 | Kuhar et al. | 341/23 |
| 4,803,613 A * | 2/1989 | Kametani et al. | 700/3 |
| 5,058,000 A * | 10/1991 | Cox et al. | 707/10 |
| 5,796,641 A * | 8/1998 | Tu | 708/204 |
| 5,826,257 A * | 10/1998 | Snelling, Jr. | 707/4 |

* cited by examiner

*Primary Examiner*—Lynne H. Browne
*Assistant Examiner*—Stefan Stoynov
(74) *Attorney, Agent, or Firm*—Blakely, Sokoloff, Taylor & Zafman LLP

(57) ABSTRACT

Methods and apparatuses for processing a request to program a device in a data processing system having an operating system (OS) executed therein are described herein. In one aspect of the invention, an exemplary method includes indexing the request to a data structure containing information cross-referencing a list of actions dedicated to the request, the data structure linking with at least one table having data information related to the list of actions, the at least one table being independent of the OS and the device, looking up the at least one table to retrieve the data information related to the list of actions, and instructing a function to program the device based on the data information retrieved from the at least one table, operation of the function being independent of the device. Other methods and apparatuses are also described.

20 Claims, 27 Drawing Sheets

FIG. 13

| Offset | Value | Description |
|---|---|---|
| 0000 | 01 | Version 1.0 of TBDS |
| 0001 | 00 | Customer ID |
| 0002 | 0000 | Customer Version (the TDBS is unchanged) |
| 0004 | 00000000 | Size of the Host (no Host) |
| 0008 | 04 | The TDBS defines 4 hardware register types |
| 0009 | 0017 | The Array of Register Type descriptors starts at 0017 |
| 000B | 08 | The TDBS defines 8 POST Actions |
| 000C | 001F | The Array of POST Actions starts at 001F |
| 000E | 05 | The TDBS defines 5 Scratch Fields |
| 000F | 0057 | The Array of Scratch Field descriptors starts at 0057 |
| 0011 | 05 | The TDBS defines 5 Tables with data |
| 0012 | 0075 | The Array of Table descriptors starts at 0075 |
| 0014 | 02 | The TDBS defines 2 Status Words |
| 0015 | 0093 | The Array of Status Word descriptors starts at 0093 |

FIG. 14

| Offset | Value | Description |
|---|---|---|
| 0017 | 01 | Register ID = 1, further referred to as REG1 |
| 0018 | 00 | 8-bit register |
| 0019 | 03 | Register ID = 3, further referred to as REG3 |
| 001A | 00 | 8-bit register |
| 001B | 04 | Register ID = 4, further referred to as REG4 |
| 001C | 01 | 16-bit register |
| 001D | 05 | Register ID = 5, further referred to as REG5 |
| 001E | 02 | 32-bit register |

FIG. 15

| Offset | Value | Description |
|---|---|---|
| 0057 | 00 | Field ID = 00, further referred to as SF0 |
| 0058 | 01 | Register type: REG3 |
| 0059 | 0000 | Register index = 0 |
| 005B | 00 | Start bit = 0 |
| 005C | 02 | Field width = 2 |
| 005D | 01 | Field ID = 01, further referred to as SF1 |
| 005E | 01 | Register type: REG3 |
| 005F | 0000 | Register index = 0 |
| 0061 | 02 | Start bit = 2 |
| 0062 | 01 | Field width = 1 |
| 0063 | 02 | Field ID = 02, further referred to as SF2 |
| 0064 | 01 | Register type: REG3 |
| 0065 | 0000 | Register index = 0 |
| 0067 | 03 | Start bit = 3 |
| 0068 | 02 | Field width = 2 |
| 0069 | 03 | Field ID = 03, further referred to as SF3 |
| 006A | 01 | Register type: REG3 |
| 006B | 0001 | Register index = 1 |
| 006D | 07 | Start bit = 7 |
| 006E | 01 | Field width = 1 |
| 006F | 04 | Field ID = 04, further referred to as SF4 |
| 0070 | 01 | Register type: REG3 |
| 0071 | 0001 | Register index = 1 |
| 0073 | 06 | Start bit = 6 |
| 0074 | 01 | Field width = 1 |

FIG. 16

| Offset | Value | Description |
|---|---|---|
| 001F | 00 | Action: Set register |
| 0020 | 01 | Use register REG3 (8-bit register) |
| 0021 | 0002 | Register index = 2 |
| 0023 | FF | Mask: FF – set all bits |
| 0024 | 00 | Register value to set |
| 0025 | 00 | Action: Set register |
| 0026 | 02 | Use register REG4 (16-bit register) |
| 0027 | 0000 | Register index = 0 |
| 0029 | FFFF | Mask: FFFF – set all bits |
| 002B | 0000 | Register value to set |
| 002D | 00 | Action: Set register |
| 002E | 03 | Use register REG5 (32-bit register) |
| 002F | 0000 | Register index = 0 |
| 0031 | FFFFFFFF | Mask: FFFFFFFF – set all bits |
| 0035 | 00000000 | Register value to set |
| 0039 | 01 | Action: Set Scratch Field |
| 003A | 00 | Use Scratch Field SF0 |
| 003B | 00000003 | Value to set |
| 003F | 01 | Action: Set Scratch Field |
| 0040 | 01 | Use Scratch Field SF1 |
| 0041 | 00000000 | Value to set |
| 0045 | 01 | Action: Set Scratch Field |
| 0046 | 02 | Use Scratch Field SF2 |
| 0047 | 00000000 | Value to set |
| 004B | 01 | Action: Set Scratch Field |
| 004C | 03 | Use Scratch Field SF3 |
| 004D | 00000000 | Value to set |
| 0051 | 01 | Action: Set Scratch Field |
| 0052 | 034 | Use Scratch Field SF4 |
| 0053 | 00000001 | Value to set |

FIG. 17

| Offset | Value | Description |
|---|---|---|
| 0075 | 30 | Table type: Data table, Index width: 3 bits |
| 0076 | 00 | Purpose ID = 0 |
| 0077 | 00C8 | Offset of the beginning of the table, further referred as T0 |
| 0079 | 0005 | Number of entries in the table = 5 |
| 007B | 40 | Table type: Data table, Index width: 4 bits |
| 007C | 00 | Purpose ID = 0 |
| 007D | 0114 | Offset of the beginning of the table, further referred as T1 |
| 007F | 0008 | Number of entries in the table = 8 |
| 0081 | 20 | Table type: Data table, Index width: 2 bits |
| 0082 | 00 | Purpose ID = 0 |
| 0083 | 016A | Offset of the beginning of the table, further referred as T2 |
| 0085 | 0003 | Number of entries in the table = 3 |
| 0087 | 40 | Table type: Data table, Index width: 4 bits |
| 0088 | 00 | Purpose ID = 0 |
| 0089 | 0186 | Offset of the beginning of the table, further referred as T3 |
| 008B | 0009 | Number of entries in the table = 9 |
| 008D | 31 | Table type: Pseudo Code Functions, Index width: 3 bits |
| 008E | 00 | Purpose ID = 0 |
| 008F | 01D2 | Offset of the beginning of the table, further referred as T4 |
| 0091 | 0004 | Number of entries in the table = 4 |

FIG. 18

| Offset | Value | Description |
|---|---|---|
| 00C8 | 0C | Table properties: no data swapping; arrays of delays and masks are supplied; delays are expressed in CRT Vsyncs |
| 00C9 | 00EC | Offset of the first entry |
| 00CB | 08 | Size of an entry = 8 bytes |

| Offset | Value | Description |
|---|---|---|
| 00CC | 00 | Table Column register: REG1 (8-bit register) |
| 00CD | 0000 | Register index = 0 |
| 00CF | FF | Register mask = FF (program all the bits) |
| 00D0 | 05 | Delay: 5 CRT Vsyncs |
| 00D1 | 00 | Table Column register: REG1 (8-bit register) |
| 00D2 | 0001 | Register index = 1 |
| 00D4 | FF | Register mask = FF (program all the bits) |
| 00D5 | 05 | Delay: 5 CRT Vsyncs |
| 00D6 | 00 | Table Column register: REG1 (8-bit register) |
| 00D7 | 0002 | Register index = 2 |
| 00D9 | FF | Register mask = FF (program all the bits) |
| 00DA | 05 | Delay: 5 CRT Vsyncs |
| 00DB | 00 | Table Column register: REG1 (8-bit register) |
| 00DC | 0003 | Register index = 3 |
| 00DE | FF | Register mask = FF (program all the bits) |
| 00DF | 05 | Delay: 5 CRT Vsyncs |
| 00E0 | 00 | Table Column register: REG4 (16-bit register) |
| 00E1 | 0000 | Register index = 0 |
| 00E3 | FFFF | Register mask = FFFF (program all the bits) |
| 00E5 | 01 | Delay: 1 CRT Vsyncs |
| 00E6 | 02 | Table Column register: REG4 (16-bit register) |
| 00E7 | 0001 | Register index = 1 |
| 00E9 | FFFF | Register mask = FFFF (program all the bits) |
| 00EB | 01 | Delay: 1 CRT Vsyncs |

| Offset | REG1.0 | REG1.1 | REG1.2 | REG1.3 | REG4.0 | REG4.1 |
|---|---|---|---|---|---|---|
| 00EC | 32 | 03 | 5F | 11 | 0000 | 0000 |
| 00F4 | 43 | 22 | 0A | 5C | 0030 | 0076 |
| 00FC | 3F | 4F | 20 | 00 | 1012 | 2B2D |
| 0104 | 10 | 9A | 04 | 80 | 2080 | 8020 |
| 010C | 00 | 00 | 40 | 11 | 2080 | 2B2D |

FIG. 19

| Offset | Value | Description |
|---|---|---|
| 0114 | 0E | Table properties: no data swapping; arrays of delays and masks are supplied; delays are expressed in Milliseconds |
| 0115 | 012A | Offset of the first entry |
| 0117 | 08 | Size of an entry = 8 bytes |

| Offset | Value | Description |
|---|---|---|
| 0118 | 03 | Table Column register: REG5 (32-bit register) |
| 0119 | 0005 | Register index = 5 |
| 011B | FFFFFFFF | Register mask = FFFFFFFF (program all the bits) |
| 011F | 0064 | Delay: 100 Milliseconds |
| 0121 | 03 | Table Column register: REG5 (32-bit register) |
| 0122 | 0006 | Register index = 6 |
| 0124 | FFFFFFFF | Register mask = FFFFFFFF (program all the bits) |
| 0128 | 0064 | Delay: 100 Milliseconds |

| Offset | REG5.5 | REG5.6 |
|---|---|---|
| 012A | 10100000 | 00FFFFFF |
| 0132 | 20200000 | 00E20000 |
| 013A | 30300000 | A400A000 |
| 0142 | 3F3F1010 | 40004000 |
| 014A | 4F4F1010 | 5F005000 |
| 0152 | 60542320 | 00900080 |
| 015A | 00710070 | 00000000 |
| 0162 | 00850084 | FFFFFF00 |

FIG. 20

| Offset | Value | Description |
|---|---|---|
| 016A | 00 | Table properties: no data swapping; no delays, no masks |
| 016B | 017A | Offset of the first entry |
| 016D | 04 | Size of an entry = 4 bytes |

| Offset | Value | Description |
|---|---|---|
| 016E | 01 | Table Column register: REG3 (8-bit register) |
| 016F | 0010 | Register index = 10 |
| 0171 | 01 | Table Column register: REG3 (8-bit register) |
| 0172 | 0012 | Register index = 12 |
| 0174 | 01 | Table Column register: REG3 (8-bit register) |
| 0175 | 0014 | Register index = 14 |
| 0177 | 01 | Table Column register: REG3 (8-bit register) |
| 0178 | 0016 | Register index = 16 |

| Offset | REG3.10 | REG3.12 | REG3.14 | REG3.16 |
|---|---|---|---|---|
| 017A | 01 | 10 | 00 | 30 |
| 017E | 02 | 20 | 4F | 40 |
| 0182 | 03 | 30 | 5F | 50 |

FIG. 21

| Offset | Value | Description |
|---|---|---|
| 0186 | 00 | Table properties: no data swapping; no delays, no masks |
| 0187 | 0193 | Offset of the first entry |
| 0189 | 07 | Size of an entry = 7 bytes |

| Offset | Value | Description |
|---|---|---|
| 018A | 01 | Table Column register: REG3 (8-bit register) |
| 018B | 0011 | Register index = 11 |
| 018D | 02 | Table Column register: REG4 (16-bit register) |
| 018E | 0002 | Register index = 2 |
| 0190 | 03 | Table Column register: REG5 (32-bit register) |
| 0191 | 0004 | Register index = 4 |

| Offset | REG3.11 | REG4.2 | REG5.4 |
|---|---|---|---|
| 0193 | 00 | 1000 | 00000000 |
| 019A | 10 | 0000 | 00300040 |
| 01A1 | 33 | 3F4F | 00310041 |
| 01A8 | 05 | 0000 | 00A000B0 |
| 01AF | 4F | 2000 | 00900080 |
| 01B6 | 20 | 3000 | 23002300 |
| 01BD | 1F | 4050 | 237F4470 |
| 01C4 | 00 | 6020 | 11002300 |
| 01CB | FF | FFFF | FFFFFFFF |

FIG. 22

| Offset | Value | Description |
|---|---|---|
| 01D2 | 01DA | Offset of the function #1 |
| 01D4 | 01DE | Offset of the function #2 |
| 01D6 | 01F2 | Offset of the function #3 |
| 01D8 | 0206 | Offset of the function #4 |

| Offset | Code | Description |
|---|---|---|
| 01DA | 02 02 05 | Wait for 5 CRT Vsyncs |
| 01DD | 00 | End of the function |

| Offset | Code | Description |
|---|---|---|
| 01DE | 18 09 02 0002 02 00 02 13 | If REG4.2 != 0 Goto 1F1 (1F1=01DE+13) |
| 01E7 | 05 09 02 0003 02 00 | REG4.3 = 0 |
| 01EE | 02 02 05 | Wait for 5 CRT Vsyncs |
| 01F1 | 00 | End of the function |

| Offset | Code | Description |
|---|---|---|
| 01F2 | 18 09 02 0003 02 00 02 13 | If REG4.3 != 0 Goto 205 (205=1F2+13) |
| 01FB | 05 09 02 0003 02 01 | REG4.3 = 1 |
| 0202 | 02 02 05 | Wait for 5 CRT Vsyncs |
| 0205 | 00 | End of the function |

| Offset | Code | Description |
|---|---|---|
| 0206 | 05 0A 01 02 00 | SF1 = 0 |
| 020B | 00 | End of the function |

FIG. 23

| Offset | Value | Description |
|---|---|---|
| 0093 | 0B | Record size = 11 bytes |
| 0094 | 02 | Properties: default entry is present, dynamic Status Word |
| 0095 | 00A9 | Offset of the transition data |
| 0097 | 03 | Input width = 3 bits |
| 0098 | 09 | Output width = 9 bits |
| 0099 | 00 01 | Input array: SF0 and SF1 |
| 009B | 00 01 02 | Output array: T0, T1 and T2 |
| 009E | 0B | Record size = 11 bytes |
| 009F | 00 | Properties: no default entry; dynamic Status Word |
| 00A0 | 00B6 | Offset of the transition data |
| 00A2 | 04 | Input width = 4 bits |
| 00A3 | 07 | Output width = 7 bits |
| 00A4 | 02 03 04 | Input array: SF2, SF3 and SF4 |
| 00A7 | 03 04 | Output array: T3 and T4 |

FIG. 24

| Offset | Value | Bit 7 | Bit 6 | Bit 5 | Bit 4 | Bit 3 | Bit 2 | Bit 1 | Bit 0 |
|---|---|---|---|---|---|---|---|---|---|
| 009A | 24 | 0 | 0 | 1 | 0 | 0 | 1 | 0 | 0 |
| 00AA | 03 | 0 | 0 | 0 | 0 | 0 | 0 | 1 | 1 |
| 00AB | 00 | 0 | 0 | 0 | 0 | 0 | 0 | 0 | 0 |
| 00AC | 01 | 0 | 0 | 0 | 0 | 0 | 0 | 0 | 1 |
| 00AD | 2C | 0 | 0 | 1 | 0 | 1 | 1 | 0 | 0 |
| 00AE | 40 | 0 | 1 | 0 | 0 | 0 | 0 | 0 | 0 |
| 00AF | E9 | 1 | 1 | 1 | 0 | 1 | 0 | 0 | 1 |
| 00B0 | A2 | 1 | 0 | 1 | 0 | 0 | 0 | 1 | 0 |
| 00B1 | E1 | 1 | 1 | 1 | 0 | 0 | 0 | 0 | 1 |
| 00B2 | D2 | 1 | 1 | 0 | 1 | 0 | 0 | 1 | 0 |
| 00B3 | 35 | 0 | 0 | 1 | 1 | 0 | 1 | 0 | 1 |
| 00B4 | 69 | 0 | 1 | 1 | 0 | 1 | 0 | 0 | 1 |
| 00B5 | A0 | 1 | 0 | 1 | | | | | |

| Start Bit | Number of Bits | Bit Sequences | Description |
|---|---|---|---|
| 00A9[7] | 9 | 001 – 0010 – 00 | Default entry output indexes: 1 – 2 – 0 |
| 00AA[6] | 16 | 00000110 – 00000000 | Number of transactions with identical "Don't Care" flags = 6 |
| 00AC[6] | 2 | 0 – 0 | "Don't Care" flags |
| 00AC[4] | 3 | 00 – 0 | Input combination #1: 0 – 0 |
| 00AC[1] | 9 | 010 – 0101 – 10 | Output combination #1: 2 – 5 – 2 |
| 00AD[0] | 3 | 00 – 1 | Input combination #2: 0 – 1 |
| 00AE[5] | 9 | 000 – 0001 – 11 | Output combination #2: 0 – 1 – 3 |
| 00AF[4] | 3 | 01 – 0 | Input combination #3: 1 – 0 |
| 00AF[1] | 9 | 011 – 0100 – 01 | Output combination #3: 3 – 4 – 1 |
| 00B0[0] | 3 | 01 – 1 | Input combination #4: 1 – 1 |
| 00B1[5] | 9 | 100 – 0011 – 10 | Output combination #4: 4 – 3 – 2 |
| 00B2[4] | 3 | 10 – 0 | Input combination #5: 2 – 0 |
| 00B2[1] | 9 | 100 – 0110 – 10 | Output combination #5: 4 – 6 – 2 |
| 00B3[0] | 3 | 10 – 1 | Input combination #6: 2 – 1 |
| 00B4[5] | 9 | 101 – 0011 – 01 | Output combination #6: 5 – 3 – 1 |

FIG. 25

| Offset | Value | Bit 7 | Bit 6 | Bit 5 | Bit 4 | Bit 3 | Bit 2 | Bit 1 | Bit 0 |
|---|---|---|---|---|---|---|---|---|---|
| 00B6 | 01 | 0 | 0 | 0 | 0 | 0 | 0 | 0 | 1 |
| 00B7 | 00 | 0 | 0 | 0 | 0 | 0 | 0 | 0 | 0 |
| 00B8 | 20 | 0 | 0 | 1 | 0 | 0 | 0 | 0 | 0 |
| 00B9 | 40 | 0 | 1 | 0 | 0 | 0 | 0 | 0 | 0 |
| 00BA | 08 | 0 | 0 | 0 | 0 | 1 | 0 | 0 | 0 |
| 00BB | 00 | 0 | 0 | 0 | 0 | 0 | 0 | 0 | 0 |
| 00BC | 12 | 0 | 0 | 0 | 1 | 0 | 0 | 1 | 0 |
| 00BD | 93 | 1 | 0 | 0 | 1 | 0 | 0 | 1 | 1 |
| 00BE | 74 | 0 | 1 | 1 | 1 | 0 | 1 | 0 | 0 |
| 00BF | 02 | 0 | 0 | 0 | 0 | 0 | 0 | 1 | 0 |
| 00C0 | 00 | 0 | 0 | 0 | 0 | 0 | 0 | 0 | 0 |
| 00C1 | 90 | 1 | 0 | 0 | 1 | 0 | 0 | 0 | 0 |
| 00C2 | 40 | 0 | 1 | 0 | 0 | 0 | 0 | 0 | 0 |
| 00C3 | 10 | 0 | 0 | 0 | 1 | 0 | 0 | 0 | 0 |
| 00C4 | 00 | 0 | 0 | 0 | 0 | 0 | 0 | 0 | 0 |
| 00C5 | 53 | 0 | 1 | 0 | 1 | 0 | 0 | 1 | 1 |
| 00C6 | 6E | 0 | 1 | 1 | 0 | 1 | 1 | 1 | 0 |
| 00C7 | D0 | 1 | 1 | 0 | 1 | 0 | 0 | 0 | 0 |

| Start Bit | Number of Bits | Bit Sequences | Description |
|---|---|---|---|
| 00B6[7] | 16 | 00000001 – 00000000 | Number of transactions with identical "Don't Care" flags = 1 |
| 00B8[7] | 3 | 0 – 0 – 1 | "Don't Care" flags |
| 00B8[4] | 4 | 00 – 0 – 1 | Input combination #1: 0 – 0 – 0 |
| 00B8[0] | 7 | 0010 – 000 | Output combination #1: 2 – 0 |
| 00B9[1] | 16 | 00000010 – 00000000 | Number of transactions with identical "Don't Care" flags = 2 |
| 00BB[1] | 3 | 0 – 0 – 0 | "Don't Care" flags |
| 00BC[6] | 4 | 00 – 1 – 0 | Input combination #2: 0 – 1 – 0 |
| 00BC[2] | 7 | 0101 – 001 | Output combination #2: 5 – 1 |
| 00BD[3] | 4 | 00 – 1 – 1 | Input combination #3: 0 – 1 – 1 |
| 00BE[7] | 7 | 0111 – 010 | Output combination #3: 7 – 2 |
| 00BE[0] | 16 | 00000001 – 00000000 | Number of transactions with identical "Don't Care" flags = 1 |
| 00C0[0] | 3 | 0 – 1 – 0 | "Don't Care" flags |
| 00C1[5] | 4 | 01 – 0 – 0 | Input combination #4: 1 – 0 – 0 |
| 00C1[1] | 7 | 0001 – 000 | Output combination #4: 1 – 0 |
| 00C2[2] | 16 | 00000010 – 00000000 | Number of transactions with identical "Don't Care" flags = 2 |
| 00C4[2] | 3 | 0 – 0 – 0 | "Don't Care" flags |
| 00C5[7] | 4 | 01 – 0 – 1 | Input combination #5: 1 – 0 – 1 |
| 00C5[3] | 7 | 0011 – 011 | Output combination #5: 3 – 3 |
| 00C6[4] | 4 | 01 – 1 – 1 | Input combination #6: 1 – 1 – 1 |
| 00C6[0] | 7 | 0110 – 100 | Output combination #6: 6 – 4 |

FIG. 26

TABLE-DRIVEN HARDWARE CONTROL SYSTEM

FIELD OF THE INVENTION

This application relates to the field of a data processing system; and more specifically, to table-driven software systems that control hardware devices.

BACKGROUND OF THE INVENTION

The conventional approach to complex hardware programming is called a procedural approach and based on a set of procedures or functions, where each function is responsible for programming a particular functional block of a hardware unit. FIG. 1 shows a simplified block diagram of a conventional approach in the art. The system includes software such as operating system 101, firmware 102, and hardware 103. The applications 104 and the device drivers are running in the software layer 101. The basic input/output system (BIOS) 106 is running in the firmware 102, embedded in a memory of the device 107. The device drivers 105 (e.g., display driver) communicate with the BIOS 106 to program the hardware device 107. The BIOS typically includes a set of procedures or functions to program a particular functional block of the hardware device 107.

This approach seems like a good and straightforward solution, but it has a few major drawbacks. Complicated hardware complicates the controlling software's logic (e.g., BIOS 106), which makes it hard to maintain, modify, and add new features.

In addition, procedural approach limits or in some cases eliminates portability of the final software module between different operating systems such as Windows and Linux, and different levels of software, such as firmware, device drivers, and applications. As a result, if a user desires to develop a set of software consisting of modules of different types, such as BIOS, device drivers, and applications, for a hardware unit, and the modules would need to control same parts of the hardware, there would be duplications of functionality implemented differently for software of different types. Further, if a hardware-related system function needs a change (e.g., as the result of a hardware modification), all related modules would need to be updated one by one, which increases a chance for a coding error and synchronization issues.

Furthermore, in order to modify the controlling software one needs to be an expert not only in the hardware but also in the language the software has been written with. In addition, one needs to be very familiar with the architecture of the controlling software, which makes the number of people capable of making the change very small. Therefore, a better solution is desirable.

SUMMARY OF THE INVENTION

Methods and apparatuses for processing a request to program a device in a data processing system having an operating system (OS) executed therein are described herein. In one aspect of the invention, an exemplary method includes indexing the request to a data structure containing information cross-referencing a list of actions dedicated to the request, the data structure linking with at least one table having data information related to the list of actions, the at least one table being independent of the OS and the device, looking up the at least one table to retrieve the data information related to the list of actions, and instructing a function to program the device based on the data information retrieved from the at least one table, operation of the function being independent of the device.

In one particular exemplary embodiment, the method includes interpreting the data information retrieved from the at least one table, and generating an instruction stream based on the interpretation, the instruction stream representing the list of actions the function carries out. In a further alternative embodiment, the method includes determining a set hardware registers need to be programmed, looking up a first table to determine a list of actions based on the determined hardware registers, searching a transition based on the list of actions in a second table pointed by the first table, the transition including data and hardware registers location, and performing the transition based on the information retrieved from the second table.

The present invention includes apparatuses which perform these methods and machine-readable media which, when executed on a data processing system, cause the system to perform these methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

Figure 13:
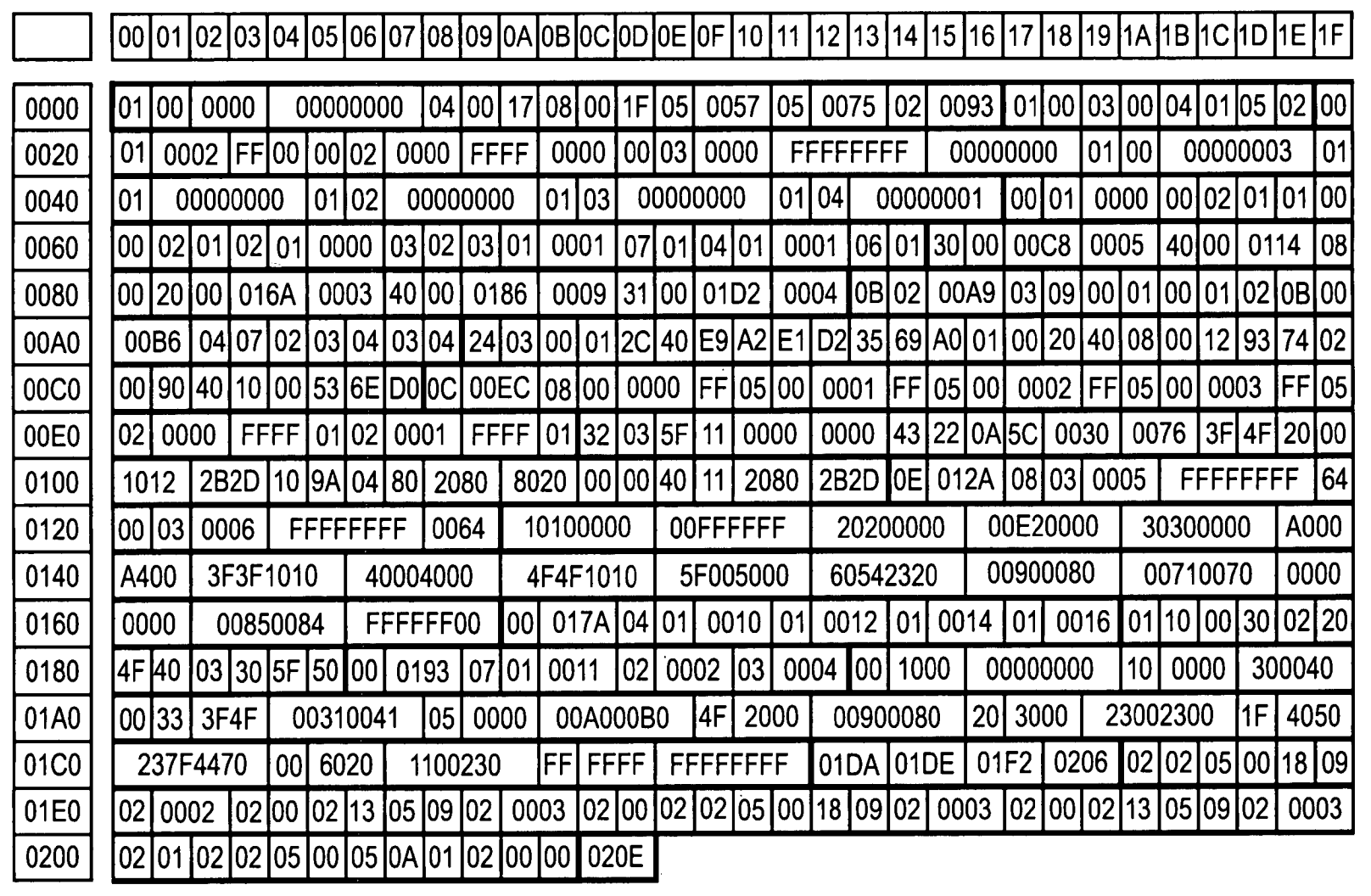

FIG. 13 shows an exemplary image of a TDBS according to one embodiment of the invention.

FIGS. 14–26 show exemplary elements of the TDBS image shown in FIG. 13.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

The present invention, in some embodiments, introduces a unique table driven method to solve the complicated issues discussed above without complicated processes. According to one embodiment of the invention, the issues discussed above are addressed by the table-driven approach, where procedure logic is substituted with a binary structure consisting of a set of tables linked in some way with each other. To add/modify a feature one needs to add/modify a table, no logic needs to be changed. All the implementation details are encapsulated and hidden from a user; therefore all the user needs to concentrate on is details of the feature that needs to be added/modified. Once created, the binary is being linked either statically or dynamically to the host software module.

In addition, according to one embodiment of the invention, in order for the host to understand the binary, the host needs to have an interpreter, which would process the binary data and program hardware in the way described by the binary. The table-driven binary does not contain central processing unit (CPU) specific information and no concrete hardware information, which makes the binary to be easily portable between different operating systems (OS), different environments and practically any kind of hardware. However, the correct interpreter has to be supplied for a particular OS or environment. The interpreter is a logic that understands the binary and capable of programming hardware base on the information provided by the binary. In one embodiment, the interpreter is written in C programming language, which makes it portable across different platforms and environments. It is only binary module that needs to be changed in order to add a new feature or to customize the system in some way; the interpreter always stays the same.

Figure 1:
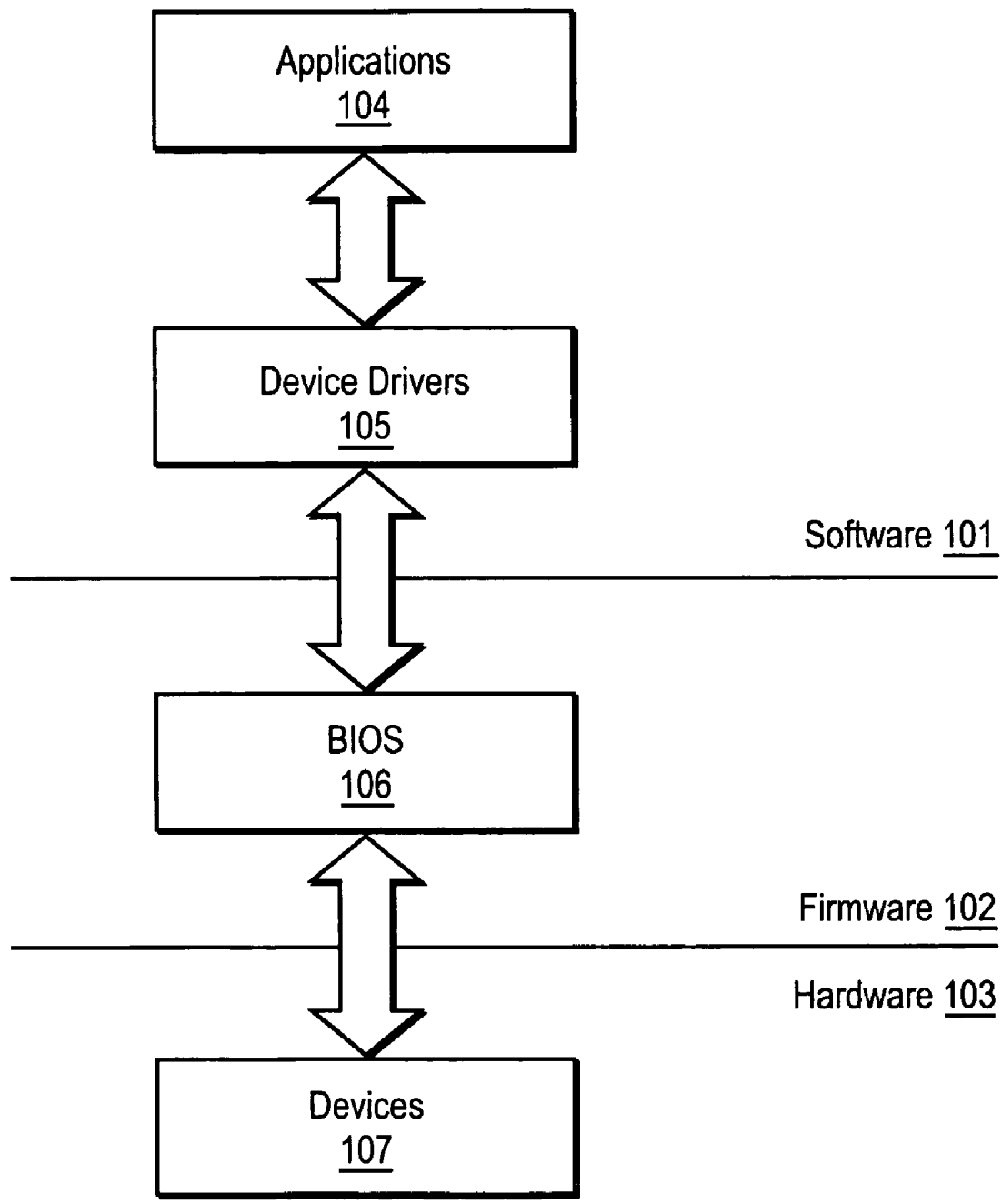
FIG. 1 shows a typical software system with conventional approach to the problem addressed by the invention.
Figure 2:
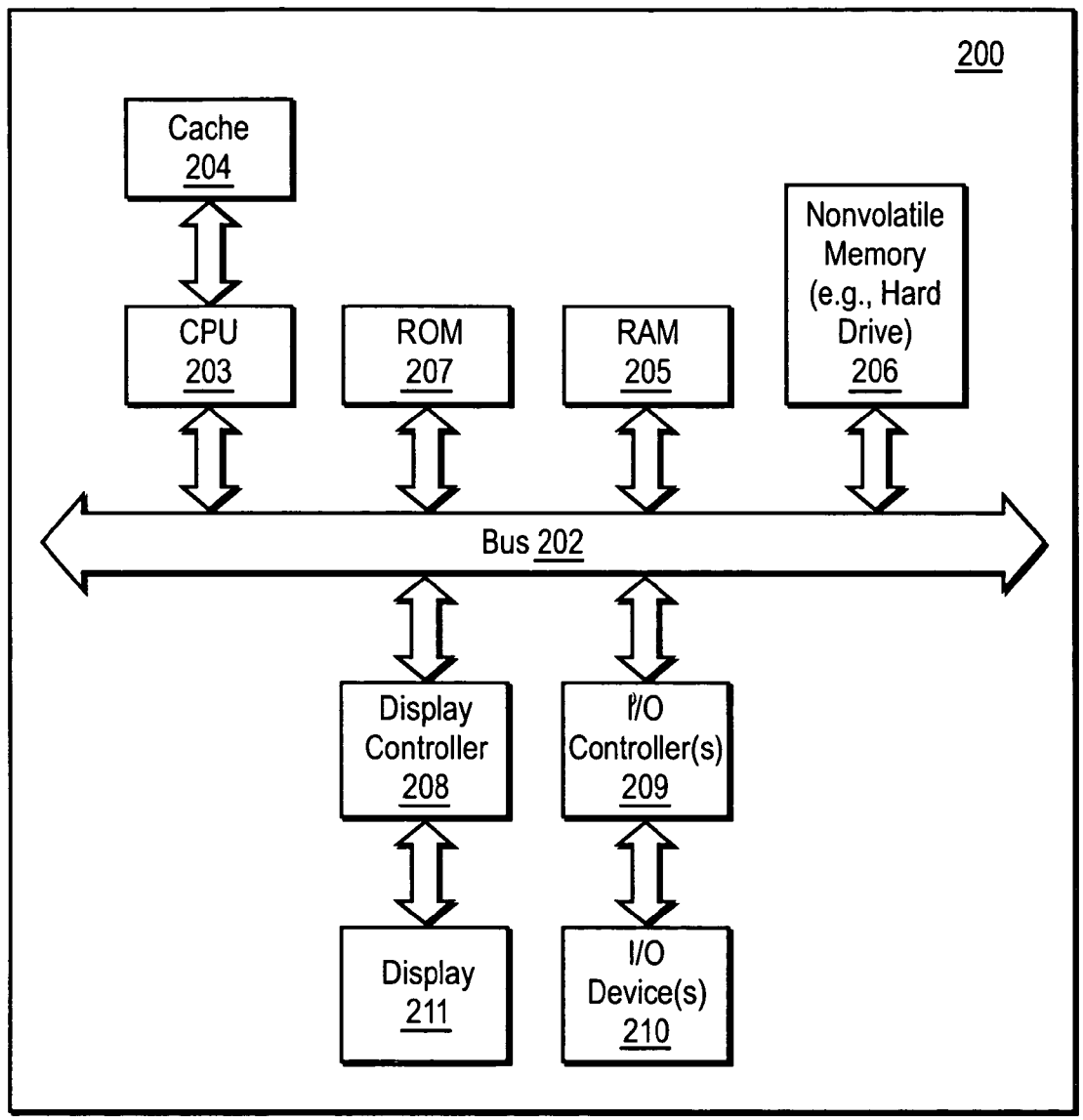
FIG. 2 shows a typical computer system which may be used with the invention.

FIG. 2 shows one example of a typical computer system which may be used with the present invention. Note that while FIG. 2 illustrates various components of a computer system, it is not intended to represent any particular architecture or manner of interconnecting the components, as such details are not germane to the present invention. It will also be appreciated that network computers and other data processing systems which have fewer components or perhaps more components may also be used with the present invention. The computer system of FIG. 2 may, for example, be an Apple Macintosh computer or an IBM compatible computer.

As shown in FIG. 2, the computer system 200, which is a form of a data processing system, includes a bus 202, which is coupled to a microprocessor 203 (CPU) and a ROM 207, a volatile memory RAM 205, and a non-volatile memory 206. The microprocessor 203, which may be a G3 or G4 microprocessor from Motorola, Inc. or IBM, is coupled to cache memory 204 as shown in the example of FIG. 2. The bus 202 interconnects these various components together and also interconnects these components 203, 207, 205, and 206 to a display controller 208 and display 211, as well as to peripheral devices such as input/output (I/O) devices, which may be mice, keyboards, modems, network interfaces, printers, and other devices, which are well known in the art. Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive, a magnetic optical drive, an optical drive, or a DVD RAM or other type of memory system which maintains data even after power is removed from the system. Typically the non-volatile memory will also be a random access memory, although this is not required.

While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

Figure 3A:
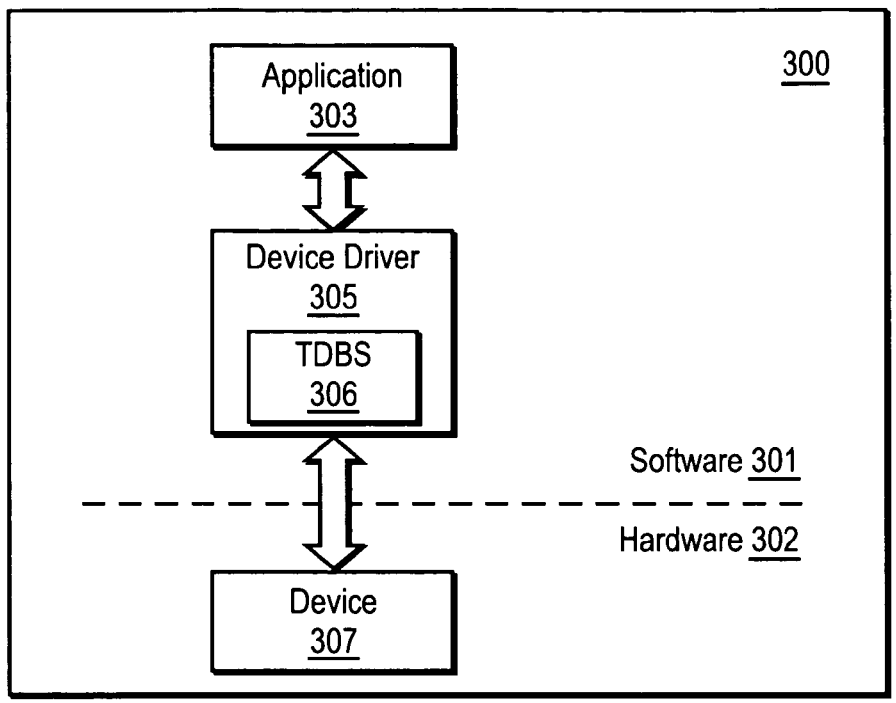
FIGS. 3A/3B show block diagrams of exemplary systems built around Table-Driven Binary System (TDBS) in accordance with an embodiment of the invention.

FIG. 3A shows a simplified block diagram of an exemplary architecture according to one embodiment of the invention. In one embodiment, the system 300 includes software portion 301 and hardware portion 302. The software portion 301 includes an application 303, a driver 305, and a TDBS 306. The hardware portion 302 includes a device 307. In one embodiment, the application 303 communicates with the device driver, which in turn communicates with the corresponding device 307 through the Table-Driven layer such as TDBS 306. The application may reside in the user space of an operating system (OS) and the device driver may reside in the kernel space of the OS. The OS is normally loaded, during the initialization of a computer system (e.g., computer system 200 of FIG. 2), into a memory location such as RAM 205 of system 200 shown in FIG. 2. The OS may be a Windows operating system. Alternatively, the OS may be a Linux or Unix operating system. Other operating systems may be utilized.

Figure 3B:
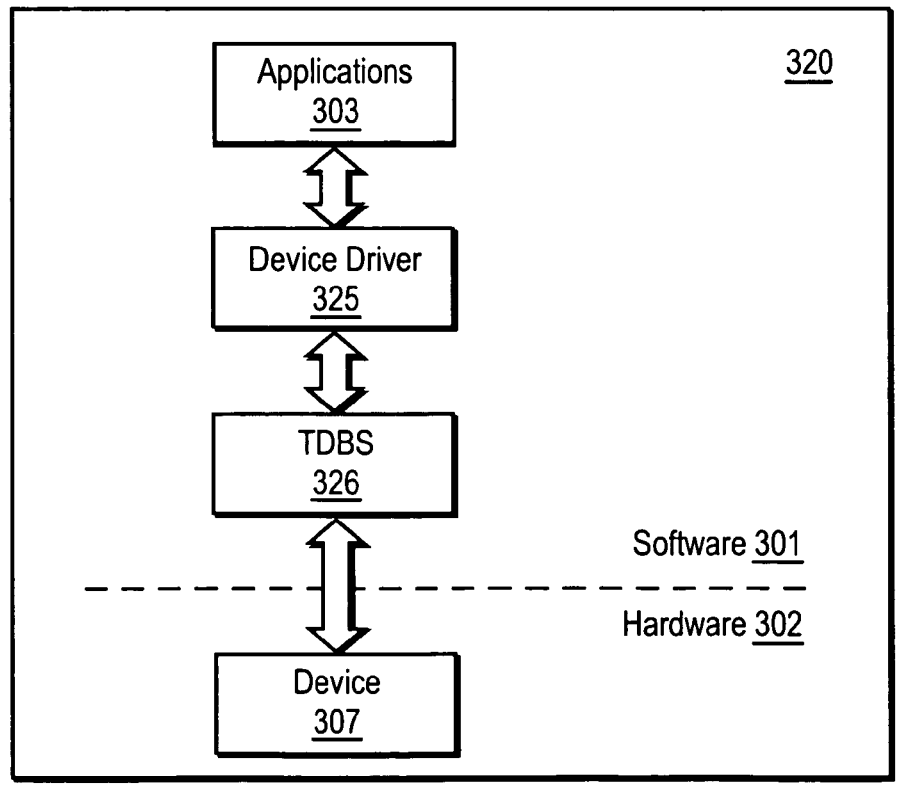
FIG. 3C shows a simplified block diagram of an exemplary table-driven system in accordance with an alternative embodiment of the invention.

In one embodiment, the TDBS 306 may be embedded in the device driver 305 as shown on FIG. 3A. Alternatively, as shown in FIG. 3B, the TDBS 326 may be a stand-alone file or library, such as dynamic linked library (DLL). When the device driver 305 receives a request to program device 307, the device driver 305 retrieves data from a plurality of tables organized by the TDBS 306 and performs a sequence of actions to program the device 307.

In one embodiment, the device driver 305 receives the request from the application 303 through an application-programming interface (API), when the user configures the system. For example, when the user needs to change display mode from 680×480 to 1024×768 pixels, the user instructs the system through an API from the application 303 to change the display mode. The display driver 305 receives the request and programs the device 307 through the TDBS 306. In addition to the described request path, there might be other ways for driver to trigger. For example, as an alternative embodiment, driver 305 polls certain status bits from the device 307 to verify certain conditions. In one embodiment, one of the conditions might be the notebook lid status: if the lid is opened, the status bit is 1, and when it is closed the status is 0. The driver 305 detects the change and programs the notebook panel using the TDBS 306 to be either on or off depends on the status of the lid.

Figure 5:
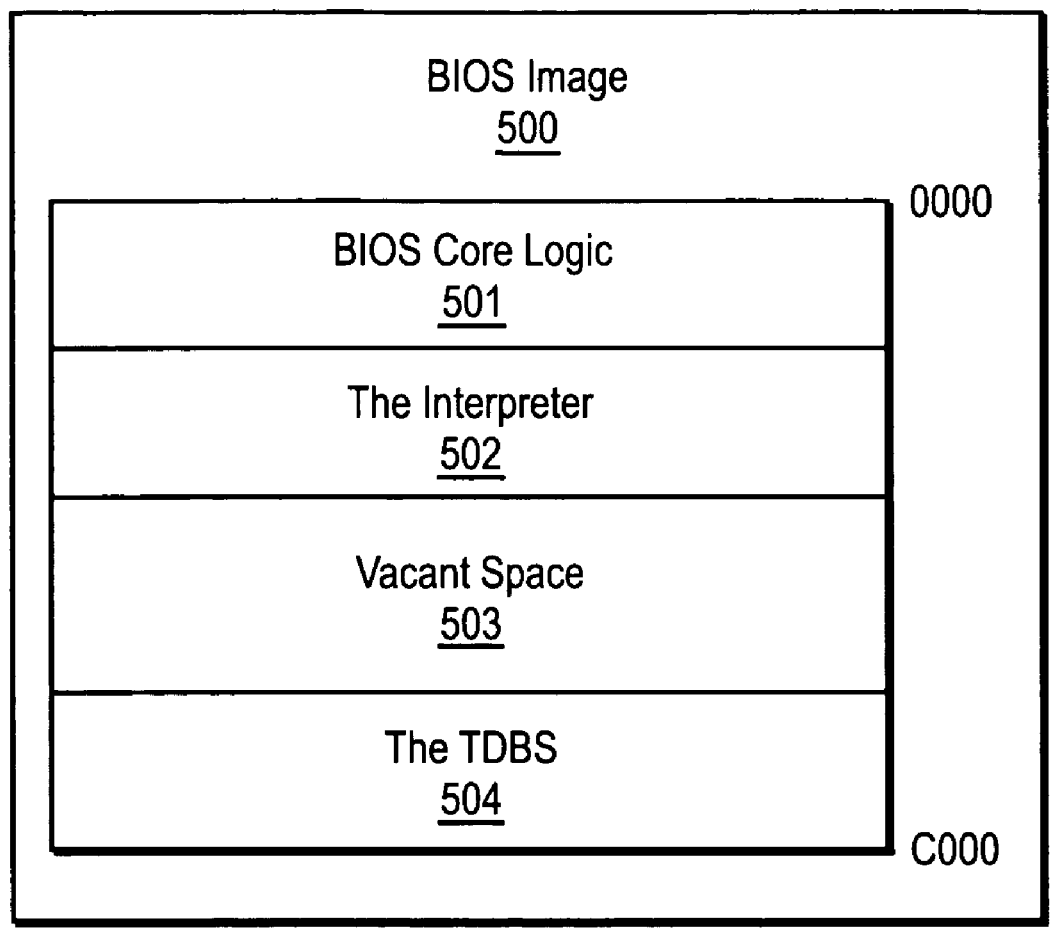
FIG. 5 shows the layout of the BIOS in one of embodiments of the invention.

In addition, it is possible for the TDBS 306 to be easily portable across different platforms (e.g., Windows, Linux, Mac OS, and Unix operating systems). It would be appreciated that the interpreter, such as interpreter 502 of FIG. 5, is implemented using one of programming languages, which allows the interpreter to be portable across different platforms. In one embodiment, for example, the interpreter may be written in ANSI C programming language.

Furthermore, the TDBS 306 is designed in such a way, which makes the TDBS potentially suitable for any kind of device 307. It is achieved by removing hardware specific information out of the TDBS in the interpreter. The TDBS and the interpreter communicate using virtual register IDs, which may be predefined during the development in a way, where every register has its own unique ID. Later the TDBS defines plurality of tables that define operations to be taken base on the IDs. The interpreter would read the TDBS in a specific manner and find commands to program different IDs with different values; then IDs are being translated to hardware registers using tables embedded inside the interpreter.

Figure 3C:
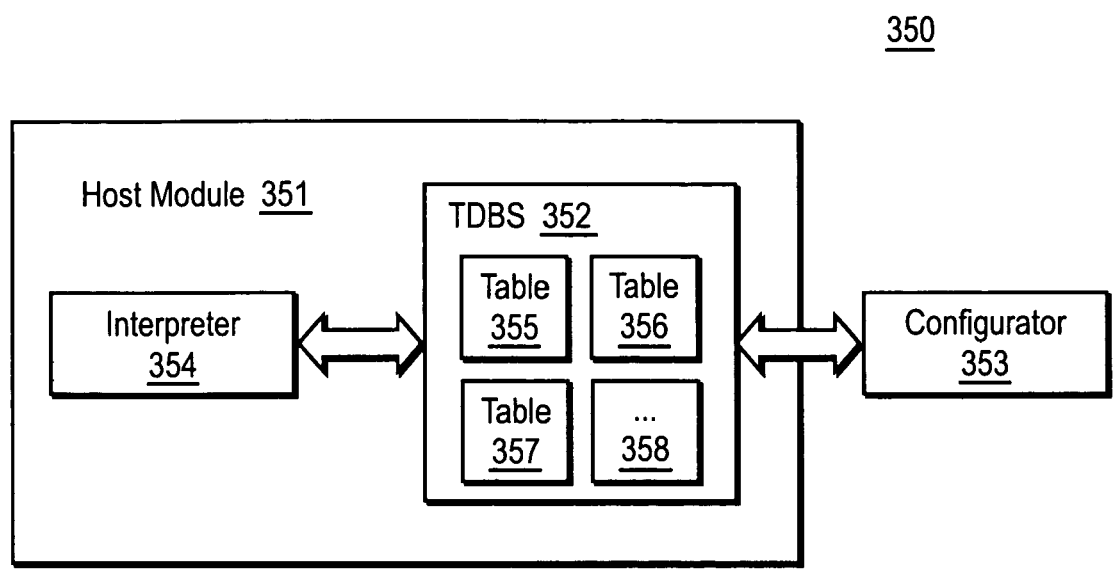

FIG. 3C shows a simplified block diagram of a table driven system according to one embodiment of the invention. In one embodiment, the system 350 includes a host module 351, an interpreter 354, a plurality of table-driven binary structures (TDBSs) 355–358, a configurator 353. The host module 351 may be implemented by a software module of any type (e.g., BIOS, device driver, or application). The host module 351 is a program that contains the interpreter 354 and TDBS 355. The TDBS 355 could be linked to the host either statically (e.g., at compilation time) or dynamically (e.g., at run time). The interpreter 354, given a pointer to the TDBS 355, by request issued by the host module 351, would process the TDBS 355 and program hardware in a manner described by the TDBS 355. The configurator 353 may be a stand-alone program that is able to view, create and change structures stored inside the TDBS 355.

Figure 4A:
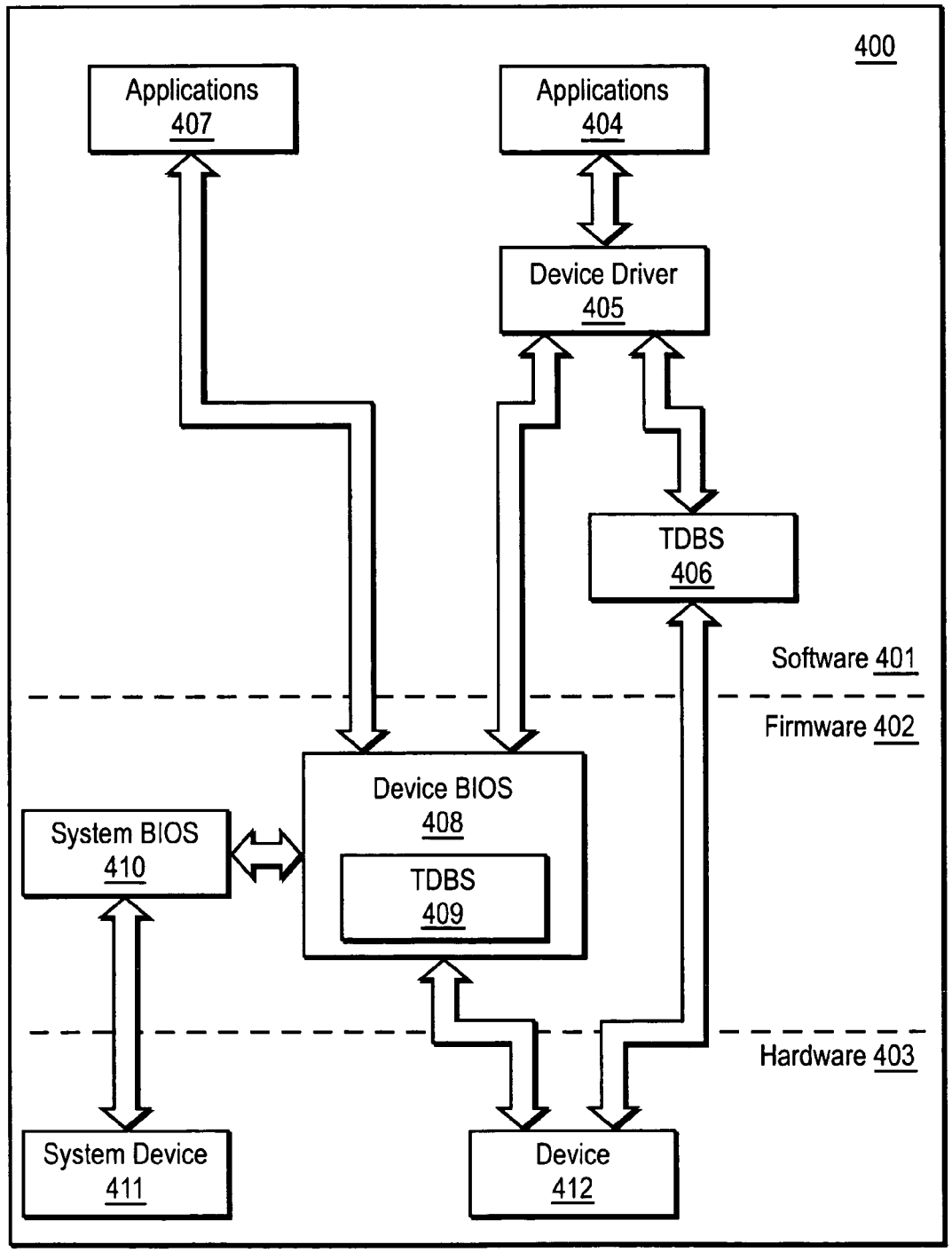
FIG. 4A shows a block diagram of an exemplary table-driven system in accordance with another alternative embodiment of the invention.

FIG. 4A shows a diagram of an exemplary table driven system according to one embodiment of the invention. In this embodiment, the system 400 includes software 401, firmware 402, and hardware 403. Software 401 includes applications 404 and 407, device driver 405 and the TDBS 406. Firmware 402 includes System BIOS 410 and Device BIOS 408 with its own copy of the TDBS 409. In the embodiment both TDBS (406 and 409) may be identical. The TDBS 409 is embedded inside Device BIOS 408 and isolates the BIOS from the device forcing it to use the table-driven technology; ideally, anything the BIOS does, goes through the TDBS. The TDBS 406 is either embedded inside device driver 405, or represented by a stand-alone binary file.

The conventional approach would suggest for driver to call the BIOS 408 whenever a complicated hardware-related task needs to be carried out. The architecture that involves direct communication between device driver and BIOS has a few major drawbacks. Although this topic deserves a separate discussion, here are a few examples: a) driver that heavily relies on BIOS cannot be used in BIOS-less environments like Windows CE or Linux; b) usually BIOS is called using software interrupts, and one cannot guarantee which BIOS will respond to the interrupt; c) in this kind of architecture certain functions are forced to be duplicated both in driver and BIOS, which introduces duplication of code and higher probability of human error.

The TDBS 406 delivers to the driver all the functionality that BIOS has and by doing so eliminates the need of calling BIOS, since now the driver is capable of driving the device on its own.

In this embodiment the system receives a very significant advantage to compare with the conventional approach: single core for both BIOS and driver. Which means if there is a feature that needs to be updated/added, only one place needs to be changed—the TDBS; after the change is done, the new TDBS needs to be embedded inside BIOS and embedded (or copied in appropriate directory) inside driver. Other code besides the TDBS (for example the rest of the BIOS or driver) does not need a change, which means there is no need to recompile/rebuild the system, since the TDBS is just an external set of tables.

Also in this embodiment, since to make a change in the system does not require the system to be recompiled/relinked, the change can be made, for example, by OEM customers if they have a tool capable of modifying the TDBS. In one of embodiments used such a tool called Configurator, which is a Windows-based program capable of displaying the system of tables stored in the TDBS and allows to make any change to the structure and then save it back in binary format.

Figure 4B:
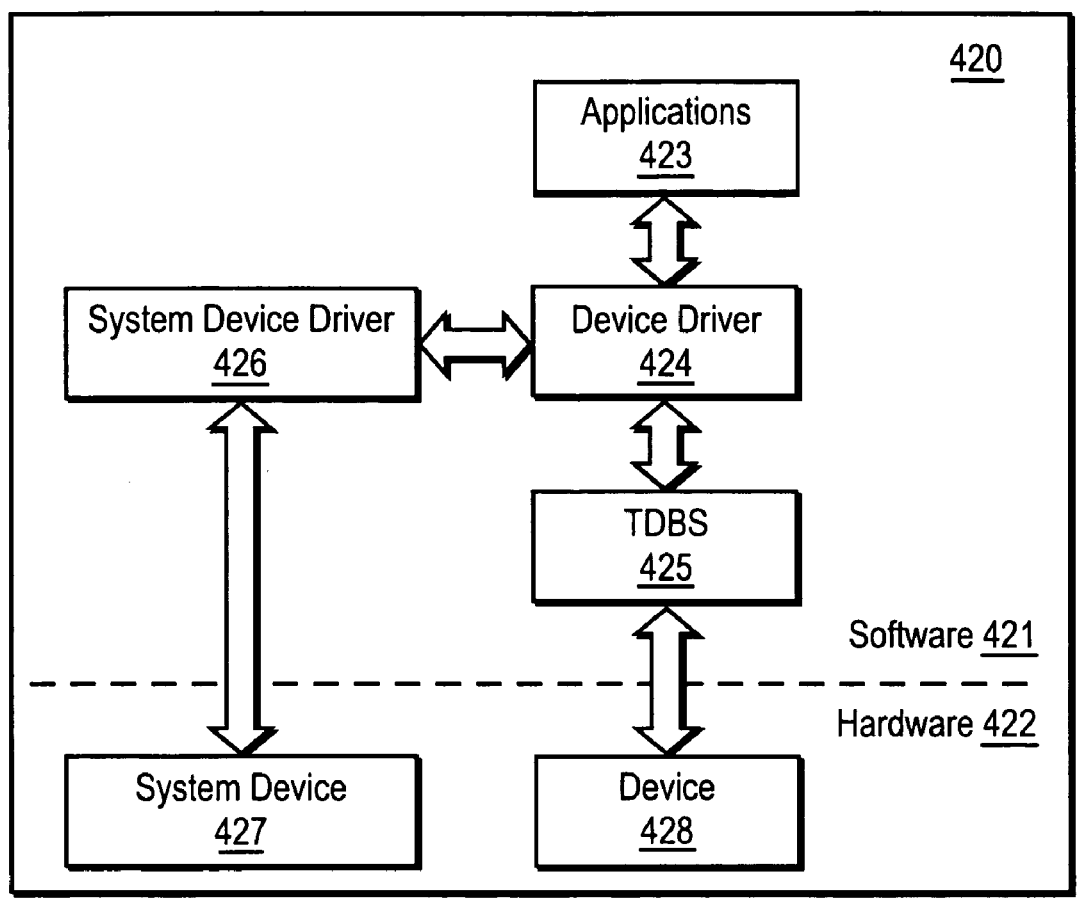
FIG. 4B shows a block diagram of an exemplary table-driven system in accordance with yet another alternative embodiment of the invention.

FIG. 4B shows a block diagram of an exemplary BIOS-less system. The system is very similar to the one showed on the FIG. 4A. Because of utilizing the table-driven architecture using the TDBS, the Device Driver 424 could be source-wise (and in some instances even binary-wise) the same with 405 from FIG. 4A.

FIG. 5 shows a binary layout an exemplary table driven Video BIOS according to one embodiment of the invention. In one embodiment, the BIOS image 500 has a size of 48 kilobytes. The image contains the BIOS Video Core logic 501, the interpreter 502, empty space available for future development 503 and the TDBS 504. The Video Core 501 contains standard VGA functions necessary to comply with standard IBM-defined interrupt 10h functionality. The interpreter 502 is necessary to decode information that contains inside the TDBS. The interpreter contains functions capable of programming hardware registers of VGA device; every function has a unique ID assigned on development stage; the TDBS uses the IDs inside plurality of tables to inform the interpreter what needs to be done in every particular situation. The TDBS is located at the very end of the image and is aligned by the end of it; in between the TDBS and the interpreter resides an empty space necessary to make the binary 48K in size.

Figure 6:
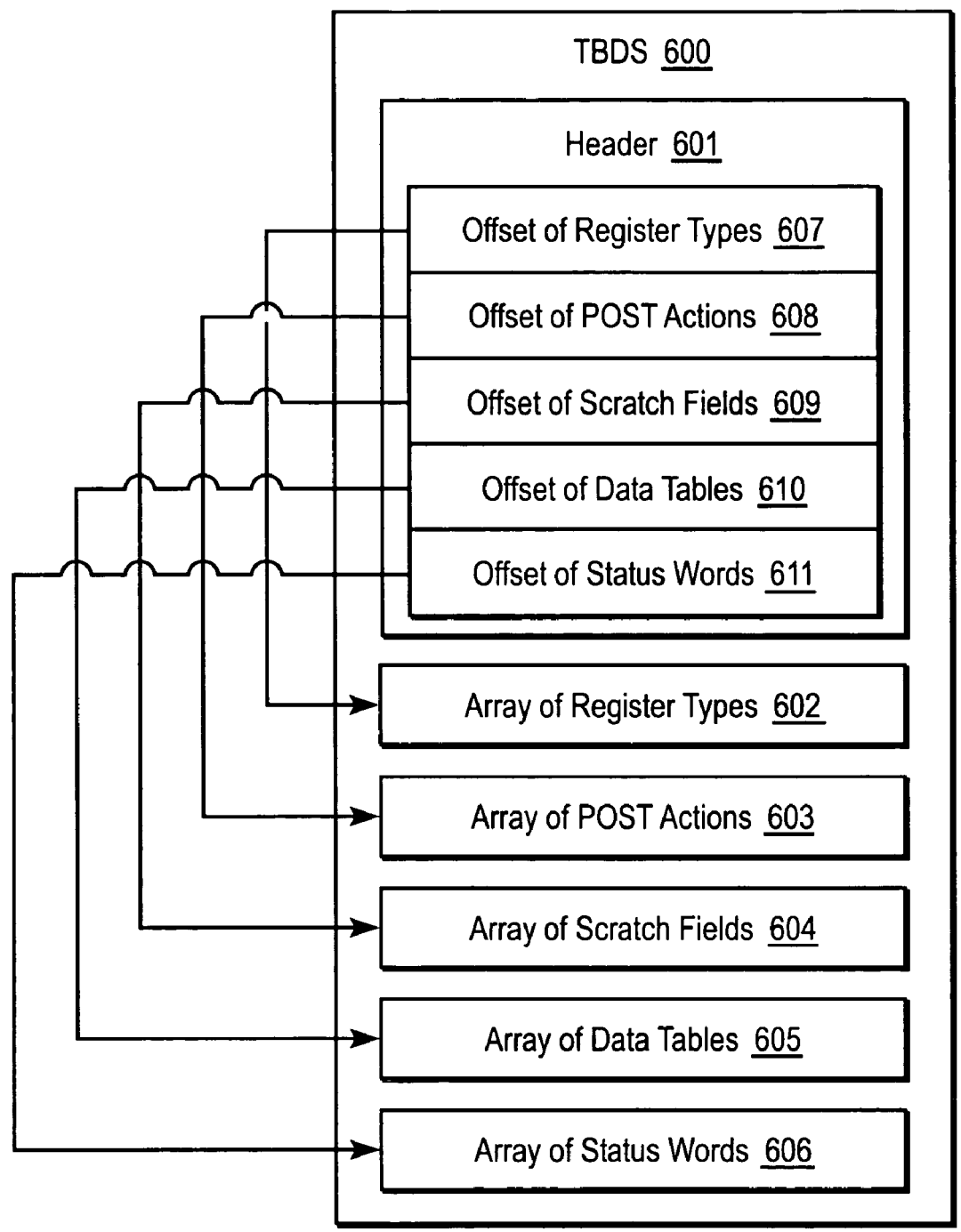
FIG. 6 shows the layout of the TDBS in accordance with an alternative embodiment of the invention.

FIG. 6 shows a layout of an exemplary TDBS according to an embodiment of the invention. In one embodiment, the TDBS 600 includes the header 601 and a plurality of tables including, among others, table of register types 602, power-on self test (POST) action table 603, table of scratch field descriptors 604, data tables 605, and status word tables 606. In the embodiment, the header 601 includes register type offset field 607 pointing to the offset of the register type tables 602, POST action offset field 608 pointing to the offset of the POST action tables 603, scratch field offset field 609 pointing to the offset of the scratch field tables 604, data table offset field 610 pointing to the offset of the data tables 605, and status word offset field 611 pointing to the offset of the status word tables 606.

When an interpreter, receives a request to program the hardware, the interpreter determines the position of the TDBS' header 601. Then it looks into the header 601 of the TDBS 600 to retrieve the offsets of the tables (e.g., tables 602–606, and others) and retrieve the corresponding data or actions dedicated to the request. The interpreter then uses the retrieved information to program the hardware (e.g., device 412).

In one embodiment, the TDBS 600 includes at least one of the following parts:

The Header;
Array of POST Actions;
Array of Register Type descriptors;
Array of Scratch Field descriptors;
Array of Table descriptors;
Array of Status Word descriptors;
Transition records;
Data Table data;
Size Signature.

Wherein the header (e.g., header 601) stores key information about the structure, such as structure version, information about the host and references to the other structure parts. In one embodiment, the header 601 includes at least one of the following data members:

| Name | Descriptions |
| --- | --- |
| VersionNumber | Version of the TDBS; gives an ability to identify features supported by the structure. |
| CustomerID | An ability to create a list of configurations with different IDs (for different customers, different hardware) and have slightly or completely different TDBS defined for different configurations. If a user needs to compile the TDBS, he/she would need to specify the ID of the target configuration, such that the Configurator would create the final binary with information relevant to the specified configuration, and would disregard the rest. The CustomerID field retains the ID of the configuration, so it would be possible to identify the binary after it has been compiled. |
| CustomerVersion | The field is incremented automatically every time the binary gets overwritten by the Configurator. The field serves the purpose to identify whether the TDBS has been changed since its creation. |
| HostCodeSize | When Configurator attaches the TDBS to the end of the specified Host, it stores the size of the Host in this field. This field is used to control the size of the Host module. |
| RegisterTypeCount | The field keeps the number of the descriptors stored in the array of Register Type descriptors. |
| RegisterTypeOffse | The field keeps the offset of the array of Register Type descriptors. The offset is a value that represents the number of bytes from the beginning of the TDBS to the beginning of the array. |
| POSTActionCount | The field contains the number of actions stored in the array of POST Actions. |
| POSTActionOffset | The field keeps the offset of the array of POST Actions. The offset is a value that represents the number of bytes from the beginning of the TDBS to the beginning of the array. |
| ScratchFieldCount | The field contains the number of descriptors stored in the array of Scratch Field descriptors. |
| ScratchFieldOffset | The field keeps the offset of the array of Scratch Field descriptors. The offset is a value that represents the number of bytes from the beginning of the TDBS to the beginning of the array. |
| DataTableCount | The field contains the number of descriptors stored in the array of Data Table descriptors. |
| DataTableOffset | The field keeps the offset of the array of Data Table descriptors. The offset is a value that represents the number of bytes from the beginning of the TDBS to the beginning of the array. |
| StatusWordCount | The field contains the number of descriptors stored in the array of Status Word descriptors. |
| StatusWordOffset | The field keeps the offset of the array of Status Word descriptors. The offset is a value that represents the number of bytes from the beginning of the TDBS to the beginning of the array. |

Other information or members may be defined in the header.

Every hardware register that being accessed by the TDBS may be required to be defined before it's actually used. Register is considered defined if it's assigned a unique ID and a descriptor. Different parts of the TDBS define different actions upon hardware registers: those are either write or read operations. The TDBS only defines the operations, which get executed by the Interpreter or by the Host module. The definition of the TDBS does not force "hardware registers" to be actual physical hardware registers; some or all of them could be defined, for example, as regular variables, or virtual hardware registers. In one embodiment, the register type descriptor includes TypeID and DataSize members.

The TypeID represents a unique type ID. In one embodiment, the TypeID is used to reference a register in all the places where is a need to access hardware: Scratch Field descriptors, Data Tables, POST Actions. In addition, the ID may be used by the Interpreter to route read/write operations to the right routines. DatsSize stores the size ID for the register. In one embodiment, the size ID may be defined as follow:

| Size ID | Description |
| --- | --- |
| 0 | 8-bit register |
| 1 | 16-bit register |
| 2 | 32-bit register |

Other information or members may be defined in the register type descriptor.

POST Actions may be defined as a list of "actions" that need to be executed during POST (or initialization) time. In one embodiment, every action is a record that contains information to set a hardware register directly or through a Scratch Field. Every action on the list may be unconditional, in which every time there is a command to execute POST Actions, all actions with no exception will be executed one by one in the order they are defined. Although the purpose might vary, the list is intended to contain one-time settings that need to be set only once during initialization.

In one embodiment, the POST Action descriptor definition may be defined as follow:

```
struct POST_ACTION_DESCRIPTOR
{
    UInt8 ActionID;
    union
    {
        struct SET_8_BIT_REGISTER
        {
            UInt8 RegisterDescriptorIndex;
            UInt16 RegisterIndex;
```

```
        UInt8 RegisterMask;
        UInt8 RegisterValue;
    }
    struct SET_16_BIT_REGISTER
    {
        UInt8 RegisterDescriptorIndex;
        UInt16 RegisterIndex;
        UInt16 RegisterMask;
        UInt16 RegisterValue;
    }
    struct SET_32_BIT_REGISTER
    {
        UInt8 RegisterDescriptorIndex;
        UInt16 RegisterIndex;
        UInt32 RegisterMask;
        UInt32 RegisterValue;
    }
    struct SET_SCRATCH_FIELD
    {
        UInt8 ScratchFieldDescriptorIndex;
        UInt32 ScratchFieldValue;
    }
  }
}
```

In spite of a general rule accepted in some programming languages, the final size of a union should not be interpreted as the size of the longest structure. For a single POST Action descriptor defined in the TDBS binary only one structure within a union can represent the actual data format, therefore the size of the union will be determined by the size of that actual structure. The ActionID is a number that specifies the ID for the current action. In one embodiment, the ActionID may be defined as follow:

| Action ID | Description |
|---|---|
| 0 | Set hardware register |
| 1 | Set Scratch Field |

RegisterDescriptorIndex defines type of the register for the current "Set Register" action. The field is a zero-based index inside the array of Register Type descriptors. The Interpreter first reads this field to locate the right register descriptor; determines the size of the register by reading the register descriptor and then proceeds further base on this information. RegisterIndex defines the physical register index used to access register specified by the RegisterDescriptorIndex field during a "Set Register" action. Alternatively, it also could be used as an index inside an array of variables defined inside the Host module.

RegisterMask represents a mask value used to mask out certain bits during the write operation for a "Set Register" action. RegisterValue represents the actual value to set to the specified register during a "Set Register" action.

ScratchFieldDescriptorIndex defines type of the Scratch Field for the current "Set Scratch Field" action by pointing to its descriptor in the array of Scratch Field descriptors. ScratchFieldValue holds a value used to set the specified Scratch Field during a "Set Scratch Field" action.

Array of scratch Field descriptors is organized as a sequence of scratch field descriptors that immediately follow one another. A scratch field is a group of bits organized together to act as a single memory cell, which can be written or read by request. Scratch fields are used as a set of variables to represent the current state of hardware.

In one embodiment, the scratch field descriptor is defined as follows:

```
struct SCRATCH_FIELD_DESCRIPTOR
{
    UInt8 FieldID;
    UInt8 RegisterDescriptorIndex;
    UInt16 RegisterIndex;
    UInt8 StartBit;
    UInt8 FieldWidth;
}
```

FieldID represents a unique number used to access the scratch field. RegisterDescriptorIndex defines type of the register for the scratch field. The field is a zero-based index inside the array of register type descriptors. RegisterIndex is defined as a physical register index used to access register specified by the RegisterDescriptorIndex field (also could be used as an index inside an array of variables defined inside the Host module; see Array of Register Type descriptors section for details). StartBit stores a zero-based position of the first bit in the group. FieldWidth stores the number of bits in the group (Scratch Field).

Array of Table descriptors is organized as a sequence of Table descriptors that immediately follow one another. A Table descriptor defines parameters for a table that contains a set of actions to be taken under some circumstances. In one embodiment, the Table descriptor is defined as follow:

```
struct TABLE_DESCRIPTOR
{
    UInt8 TableFlags;
    UInt8 Purpose;
    UInt16 TableOffset;
    UInt16 EntryCount;
}
```

TableFlags is a bit field which may be defined as follows, according to an embodiment of the invention:

| Bit# | Description |
|---|---|
| 3-0 | Table Type (0 = Data Table, 1 = Pseudo Code Table) |
| 7-4 | Width of the Table Index in bits |

Width of the Table Index represents the number of bits needed to store the maximum value of the Table Index. For example, if table contains 9 entries, the index ranges from 0 to 8, so the maximum value of the index is 8; to store the value of 8 we need 4 bits (8 decimal=1000 binary). Purpose defines so called "Purpose ID" for a given table. This field used by the Interpreter as a filter to decide whether this table should be loaded or skipped. If the Interpreter received an array of Purpose IDs, it would compare this field to each item in the array; if a match is found, the table defined by the Table descriptor is loaded, or skipped otherwise. If the Interpreter does not receive the array, it will load all defined tables.

TableOffset keeps the offset of the beginning of the table described by the Table descriptor. The offset is a value that represents the number of bytes from the beginning of the TDBS to the beginning of the table. In other words in order to get the "real" offset, the user needs to add the contents of this field to the offset of the TDBS. EntryCount stores the number of entries in the table described by the Table descriptor.

Array of Status Word descriptors is organized as a sequence of Status Word descriptors that immediately follow one another. Status Words define behavior of the system by associating combinations of Scratch Field values with data that is used to control the hardware. The data reside in tables described in the Array of Table descriptors section. In one embodiment, the Status Word descriptor may be defined as follow:

```
struct STATUS_WORD_DESCRIPTOR
{
    UInt8 RecordSize;
    UInt8 Flags;
    UInt16 TransitionRecordsOffset;
    UInt8 InputWidth;
    UInt8 OutputWidth;
    UInt8 InputArray[n];
    UInt8 OutputArray[n];
}
```

RecordSize contains the size of the current descriptor, which is used by the Interpreter to advance the current pointer to the next structure. Flags may be defined as follows:

| Bit# | Description |
| --- | --- |
| 7-2 | Reserved |
| 1 | Presence of the default entry (=1 if present) |
| 0 | Status Word type (0 = Dynamic, 1 = Static) |

The default entry is an entry that will be selected and executed in case if the Interpreter failed to find a match for the current system conditions among the set of input combinations of the current Status Word.

Status word is called static if it consists of scratch fields that are set once (during initialization) and never get changed while the system is running; otherwise the status word is called dynamic This is used by the Interpreter as an additional filter, which means that by the user's request the Interpreter can load only static Status Words, or only dynamic or both.

TransitionRecordsOffset points to an area that defines transitions for the current status word. Transitions are associations between input combinations (Scratch Field values) and output combinations (table indexes). The offset is a value that represents the number of bytes from the beginning of the TDBS to the beginning of the transition records. In one embodiment, in order to get the "real" offset, the user needs to add the contents of this field to the offset of the TDBS.

A set of scratch fields that form status word is called input. Every scratch field in the input has its width determined by number of bits. The sum width of all scratch fields in the status word is stored in the InputWidth field. Transitions are stored in a bit-packed format. The length of the input part of all transitions defined for the current status word equals to the value stored in this field.

Similarly, every status word is associated with a set of tables (see, e.g., Array of Table descriptors section for more information). Every table has a descriptor that defines a filed called TableFlags. Bits [7–4] of the field contain the width of the table index. The sum width for indexes of all tables associated with the current Status Word is stored in the OutputWidth field. Transitions are stored in a bit-packed format. The length of the output part of all transitions defined for the current Status Word equals to the value stored in this field.

InputArray has a variable length and defines scratch fields that form the current status word. Every item in the input array is an index inside the array of scratch field descriptors. There is no field in the system that explicitly defines the number of items in the input array. The Interpreter uses field InputWidth together with FieldWidth field from Scratch Field descriptor to monitor the number of items.

OutputArray has a variable length and defines tables associated with the current Status Word. Every item in the output array is an index inside the Array of Table descriptors. There is no field in the system that explicitly defines the number of items in the output array. The Interpreter uses field OutputWidth together with TableFlags[7:4] field from table descriptor to monitor the number of items.

Transition Records is an area in the TDBS where the system keeps transitions for all defined Status Words. Transitions are stored in bit-packed blocks called Transition Blocks. Items stored in transition blocks aren't aligned by byte boundary and immediately follow each other. The blocks on the contrary are always aligned by the byte boundary and referenced by the TransitionRecordsOffset field of Status Word descriptor.

In one embodiment, the transition block may be defined as follow:

| Default Transition |
| --- |
| Number of transitions with identical "Don't Care" flags |
| Array of "Don't Care" flags |
| Input Combination #1 |
| Output Combination #1 |
| Input Combination #2 |
| Output Combination #2 |
| . . . |
| Input Combination #n |
| Output Combination #n |
| Number of transitions with identical "Don't Care" flags |
| Array of "Don't Care" flags |
| Input Combination #1 |
| Output Combination #1 |
| Input Combination #2 |
| Output Combination #2 |
| . . . |
| Input Combination #n |
| Output Combination #n |
| 0 (end of list) |

Default transition is used in a case if the Interpreter failed to find a match for the current hardware state among defined transitions. The Default transition does not have to be present in the structure. The Flags field of Status Word descriptor keeps the presence state of the default transition. Default transition does not have the input part and consists only of the output part. For detailed information on the output part please refer to the Output Combination section.

Every transition has an extra option, which in some cases helps to reduce the size of the TDBS binary. The option called Array of "Don't Care " flags. Number of items in the array is the same as number of Scratch Fields that form the Status Word the transition belongs to. Every item in the array represents a "Don't Care" flag for corresponding Scratch Field. If a "Don't Care" flag equals to 1, the value of corresponding Scratch Field is ignored for the current transition and decision whether to load the transition or not will be made base on other Scratch Fields with "Don't Care" flags equal to zero. On compile time Configurator scans list of transitions and finds consequent groups of transitions that have identical arrays of "Don't Care" flag; then those groups are stored one by one (the original order of transitions is preserved) in the binary. Every group in the binary starts with the number of transitions stored in the group. This number is a 16-bit integer that is greater then zero if a group of transitions follows and equals to zero to mark the end of the Transition Block.

Every item in the array is a Boolean that can be either 0 or 1. The array is included in Transition Block once for every group of transitions with identical "Don't Care" flags. The array is stored in a manner where every item takes one bit of binary space and next item immediately follows the current one. There is also no space left between the previous field and the beginning of the array.

The input combination is a combination of scratch field values stored in consequent order. The combination is stored in a manner where one Scratch Field follows another in disregard for the byte boundary. If a scratch field has a "Don't Care" flag set to 1, instead of the Scratch Field value zero is stored (width of the Scratch Field is maintained). Every scratch field value in the combination takes exactly as much space as defined by the FieldWidth field of the corresponding Scratch Field descriptor, measured in bits.

The output combination is a combination of Table index values stored in consequent order. The combination is stored in a manner where one index value follows another in disregard for the byte boundary. Every index in the combination represents a valid index if its value is greater then zero. Value of 1 represent the first entry in the corresponding table, value of 2 the second, and so on. Value of zero is a special condition that makes the Interpreter skip the corresponding table and move to the next one. Every index value in the output combination takes as much space as defined by the TableFlags[7:4] field of the corresponding Table descriptor, measured in bits.

Data Table data is an area within the TDBS binary where system stores tables that keep the data used to control the hardware. Basically that data is an array of hardware register values that logically distributed between different tables. There are two types of tables that introduced by the current version of the TDBS: Data Tables and Pseudo Code Function Tables.

Data Table is a table that is designed to store values for hardware registers. Data Table may include of three parts: Fixed-length header, Variable-length header, register data. In one embodiment, the fixed-length header may be defined as follows:

```
struct DATA_TABLE_FIXED_HEADER
{
    UInt8 Flags;
    UInt16 FirstEntryOffset;
    UInt8 EntrySize;
}
```

The Flags field may be defined as a bit-field parameter as follows:

| Bit# | Description |
| --- | --- |
| 7 | Reserved for internal use |
| 6:5 | Reserved |
| 4 | Swap delays with register data |
| | 0 = one delay + set of values |
| | 1 = one value + set of delays |
| | (See description below) |
| 3 | Presence of masks (=1 if present) |
| 2 | Presence of delays (=1 if present) |
| 1:0 | Type of delays: |
| | 0 = CRT Monitor Vsync delay |
| | 1 = LCD Panel Vsync delay |
| | 2 = Milliseconds |

Bit 7 is defined for internal use by the Interpreter. Bits 6–5 are reserved for future expansions. Bit 4 tells the system where delay and register values are allocated. Normally there is a single delay value per column of register values for a single register. In this case delay values are allocated in column headers (one per column) and register values are allocated in table data entries (a set per column). But there are situations when a certain set of registers requires to be programmed with just one set of values but with different time intervals between registers. In this case there is an option to swap register values with delay values, so that register values would be allocated within column headers (which limits to just one value per register), and delay values would be allocated within table entries (which gives an ability to have a set of different delay values for a single register). If this bit equals to 1 (swap), the bit 2 is ignored.

FirstEntryOffset defines the location of the first table entry. This field helps to avoid extra calculations that would be necessary to find the offset because of the variable-length part of the header. The offset is a value that represents the number of bytes from the beginning of the TDBS. In order to get the "real" offset, the user needs to add the contents of this field to the offset of the TDBS. EntrySize keeps the size of one entry in bytes, so the Interpreter could with ease advance its pointer to next entry.

The variable-length part of the Data Table header consists of an array of Data Table Column descriptors. The Data Table Column descriptor is defined bellow. There are a few structures can be seen defined in unions. In spite of a general rule accepted in some programming languages, the final size of a union should not be interpreted as the size of the longest structure. For a single descriptor defined in the TDBS binary only one structure within a union can represent the actual data format, therefore the size of the union will be determined by the size of that actual structure. In one embodiment, the variable-length part of the Data Table header may be defined as follows:

```
struct DATA_TABLE_COLUMN_DESCRIPTOR
{
    UInt8 RegisterDescriptorIndex;
    UInt16 RegisterIndex;
    union
    {
        UInt8 RegisterMask_8bit;
        UInt16 RegisterMask_16bit;
        UInt32 RegisterMask_32bit;
    }
    union
```

-continued

```
{
    UInt8 DelayValue_VSYNC;
    UInt16 DelayValue_MILLISECOND;
    UInt8 RegisterValue_8bit;
    UInt16 RegisterValue_16bit;
    UInt32 RegisterValue_32bit;
}
}
```

RegisterDescriptorIndex consists of two parts: bits [6:0] keep the type of the register that applies for the column of register values described by the current column descriptor; bit [7] keeps a flag that is used to determine whether there is a need to wait for one Vsync before the register will be set. The register type part is a zero-based index inside the array of Register Type descriptors.

RegisterIndex comprises a physical register index used for the write operation (also could be used as an index inside an array of variables defined inside the Host module; see Array of Register Type descriptors section for details).

RegisterMask represents the mask value used to mask out certain bits during the write operation. The field is optional, the presence can be verified using the Flags[3] field from the fixed-length part of the header. If Flags[3] equals to 1, the RegisterMask field is present for all columns that defined for the current Data Table; if Flags[3] is zero, the RegisterMask field is skipped for all the columns. If masks are not defined (skipped), all bits of defined register values will be set to corresponding registers.

DelayValue might be substituted for the RegisterValue field. To determine the type of the field at this location, the field DATA_TABLE_FIXED_HEADER.Flags[4] must be used. This value represents the amount of delay that will be used after the register has been set. The type of the delay is set by the Flags[1:0] field from the fixed-length part of the header. The DelayValue field is optional, the presence can be verified using the Flags[2] field from the fixed-length part of the header. If Flags[2] equals to 1, the DelayValue field is present for all columns that defined for the current Data Table; if Flags[2] is zero, the DelayValue field is skipped for all the columns. If delays are not defined (skipped), the Interpreter after it sets the current register, will immediately go to the next one without a delay.

RegisterValue might be substituted for the DelayValue field. To determine the type of the field at this location, the field DATA_TABLE_FIXED_HEADER.Flags[4] must be used. This field keeps the only register value for the register described by the column. The size of the field depends on the size of the register.

Register data is an area that keeps either the register data itself or delay values, which depends on the field DATA_TABLE_FIXED_HEADER.Flags[4]. Either way the area consists only of values that immediately follow one another. The amount of space that each value takes depends solely on the register type for register values, or delay type for delay values. For example if the register is a byte-size register, the corresponding value will take exactly one byte, or if the delay type is a Vsync, the corresponding value takes one byte of space. Once an array of values for one entry is done, another array for the next entry immediately follows. Sizewise format of all entries that belong to same table is exactly identical.

Pseudo Code Function is a set of instructions that is to be interpreted and executed by the Interpreter. In one embodiment, the header of the Pseudo Code Function table is defined as follows:

```
struct PSEUDO_CODE_HEADER
{
    UInt16 EntryOffset[n];
}
```

Where EntryOffset is an array of entry offsets. Every offset is a value that represents the number of bytes from the beginning of the TDBS to the beginning of the corresponding entry. In order to get the "real" offset, the user needs to add the contents of this field to the offset of the TDBS.

Values in the pseudo code functions could be represented in a few formats:
Constants;
Memory variables referenced by address;
Memory variables referenced by index;
Register values;
Scratch Field values.

In one embodiment, an exemplary table of Value Codes that shows how the different values are encoded may be defined as follows:

| Byte Sequence | Description |
|---|---|
| 00h xxh xxh xxh xxh | A 32-bit constant. The four bytes that follow the initial 00h are a 32-bit constant value |
| 01h xxh xxh | A 16-bit constant. The two bytes that follow the initial 01h are a 16-bit constant value |
| 02h xxh | An 8-bit constant. The byte that follows the initial 02h is an 8-bit constant value |
| 03h xxh xxh xxh xxh | A 32-bit memory variable referenced by its address. The four bytes that follow the initial 03h are a 32-bit address value. |
| 04h xxh xxh xxh xxh | A 16-bit memory variable referenced by its address. The four bytes that follow the initial 04h are a 32-bit address value. |
| 05h xxh xxh xxh xxh | An 8-bit memory variable referenced by its address. The four bytes that follow the initial 05h are a 32-bit address value. |
| 06h xxh xxh | A 32-bit memory variable referenced by its index. The four bytes that follow the initial 03h are a 16-bit index value. |
| 07h xxh xxh | A 16-bit memory variable referenced by its index. The four bytes that follow the initial 04h are a 16-bit index value. |
| 08h xxh xxh | An 8-bit memory variable referenced by its index. The four bytes that follow the initial 05h are a 16-bit index value. |
| 09h xxh xxh xxh | A hardware register value. The byte that immediately follows the initial 09h is an 8-bit index inside the Array of Register Type descriptors. The next two bytes are a register index. |
| 0Ah xxh | A Scratch Field value. The byte that follows the initial 0Ah is an 8-bit index inside the Array of Scratch Field descriptors. |

Every entry in the table is a sequence of pseudo code commands. In spite of a potential power of this feature it is advised to use the Pseudo Code Functions only as an exception to the rule. The reason is that the TDBS has been designed to abstract its user from the coding of any type and let the user to concentrate on table approach instead of the traditional procedural approach.

Commands to the pseudo codes may be defined as value codes as defined in the value codes table. In one embodiment, the commands may be defined as follows:

| Command Code | Mnemonic | Description |
| --- | --- | --- |
| 00h | END | End of function |
| 01h <amount> | SLEEPMS | Delay the program for amount of milliseconds specified by the parameter. |
| 02h <amount> | SLEEPCRT | Delay the program for amount of CRT VSyncs specified by the parameter. |
| 03h <amount> | SLEEPLCD | Delay the program for amount of LCD VSynvs specified by the parameter. |
| 04h <frequency> <delay> | SOUND | Make a sound with the specified frequency for the specified number of milliseconds. |
| 05h <destination> <source> | MOV | Copy data from source to destination. |
| 06h <destination> <source> | ADD | Add the source value to the destination. |
| 07h <destination> <source> | SUB | Subtract the source value from the destination. |
| 08h <destination> <source> | MUL | Multiply the source value by the destination. |
| 09h <destination> <source> | DIV | Divide the source value by the destination. |
| 0ah <destination> <source> | AND | Boolean AND operation. |
| 0bh <destination> <source> | OR | Boolean OR operation. |
| 0Ch <destination> <source> | XOR | Boolean XOR operation. |
| 0Dh <destination> | NOT | Boolean NOT operation. |
| 0Eh <destination> <count> | SHL | Shift to the left. |
| 0Fh <destination> <count> | SHR | Shift to the right. |
| 10h <destination> <count> | ROL | Rotate to the left. |
| 11h <destination> <count> | ROR | Rotate to the right. |
| 12h <offset> | GOTO | Jump to a command with the specified offset. The offset represents the number of bytes from the beginning of the current command sequence. |
| 13h <arg1> <arg2> <offset> | GOTO IF LESS | Compare two arguments and jump if arg1 < arg2. See GOTO command for definition of offset. |
| 14h <arg1> <arg2> <offset> | GOTO IF LESS OR EQUAL | Compare two arguments and jump if arg1 <= arg2. See GOTO command for definition of offset. |
| 15h <arg1> <arg2> <offset> | GOTO IF GREATER | Compare two arguments and jump if arg1 > arg2. See GOTO command for definition of offset. |
| 16h <arg1> <arg2> <offset> | GOTO IF GREATER OR EQUAL | Compare two arguments and jump if arg1 >= arg2. See GOTO command for definition of offset. |
| 17h <arg1> <arg2> <offset> | GOTO IF EQUAL | Compare two arguments and jump if arg1 == arg2. See GOTO command for definition of offset. |
| 18h <arg1> <arg2> <offset> | GOTO IF NOT EQUAL | Compare two arguments and jump if arg1 != arg2. See GOTO command for definition of offset. |

The size signature takes the last two bytes of the TDBS and represents the size of the structure including these two bytes. The application for that is to ease location of the beginning of the structure. The structure is designed to be either dynamically or statically linked to the Host module. In case if it is linked statically, it should be linked to the very end of the Host, so the beginning of the structure could be located by subtracting the value of this field from its offset plus two.

Figure 7:
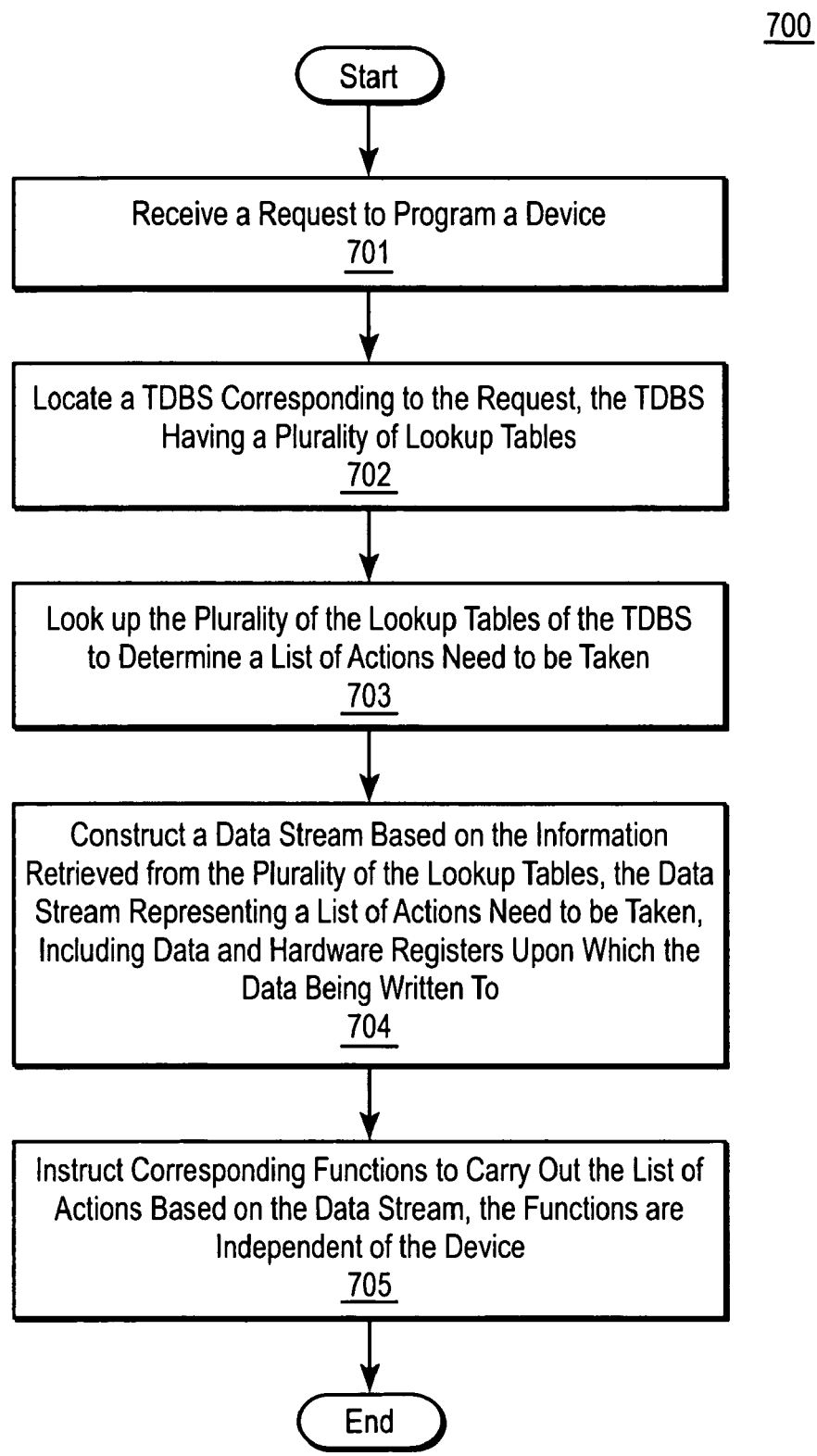
FIG. 7 shows a flowchart illustrating an exemplary method of processing a request for programming a device in accordance with an embodiment of the invention.

FIG. 7 shows a flowchart illustrating an exemplary method for processing a request to program a device in a data processing system having an operating system (OS) executed therein according to one embodiment of the invention. In one embodiment, the method 700 includes indexing the request to a data structure containing information cross-referencing a list of actions dedicated to the request, the data structure linking with at least one tables having data information related to the list of actions, the at least one tables being independent of the OS and the device, looking up the at least one tables to retrieve the data information related to the list of actions, and instructing a function to program the device based on the data information retrieved from the at least one tables, operation of the function being independent of the device.

Referring to FIG. 7, at block 701 receives a request to program a device. The request may be received from a user interface. Alternatively, the request may be received through an interrupt from the device. At block 702, the system (e.g., the host module 321 of FIG. 3B) locates a corresponding TDBS, such as TDBS 325 of FIG. 3B, based on the request, the TDBS having a plurality of lookup tables. At block 703, the interpreter, such as interpreter 324 of FIG. 3B, looks up the plurality of the tables to determine a list of actions need to be taken. The list of action may include data and the hardware registers location corresponding to the hardware device. At block 704, the interpreter constructs a data stream based on the information retrieved from the plurality of the lookup tables, the data stream representing a list of actions need to be taken, including data and hardware registers upon which the data being written to. It is important to note that the data and the tables are platform independent. They can be ported over to different platforms, such as Windows, or Linux operating systems. At block 705, the interpreter instructs corresponding functions to carry out the list actions based on the data stream, the functions are hardware independent. In one embodiment, the interpreter passes data to the functions who do not need to know hardware specific information. The data passed to the functions may include the hardware register offset and data value being written.

Figure 8:
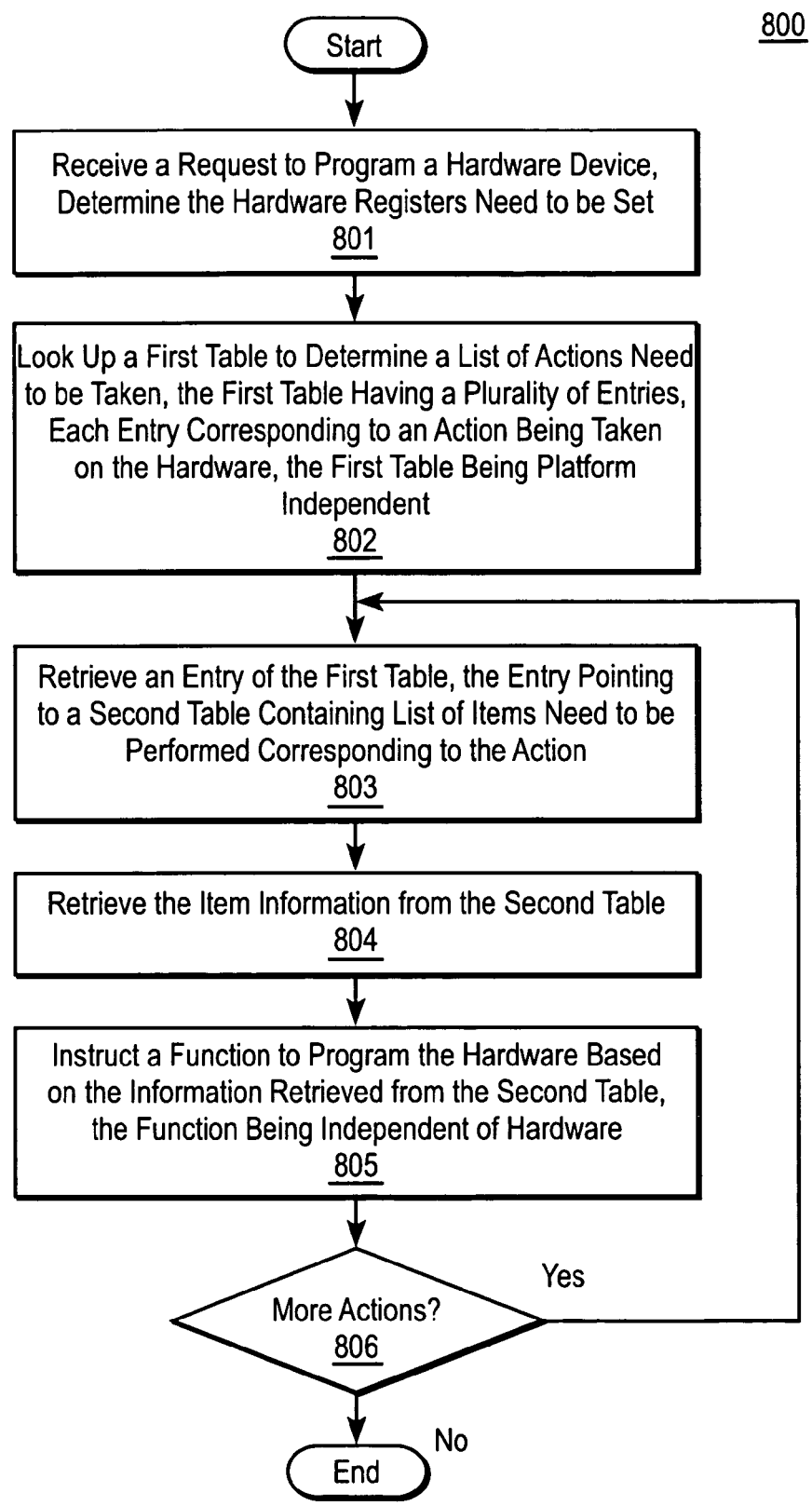
FIG. 8 shows a flowchart illustrating an exemplary method of processing a request for programming a device in accordance with an alternative embodiment of the invention.

FIG. 8 shows a flowchart illustrating an exemplary method for processing a request to program a device in a data processing system according to an alternative embodiment of the invention. When the system receives a request to program a hardware device, at block 801, the system (e.g., the host module) determines the hardware registers need to be program based on the request. The request may be received from a user interface or from an interrupt generated from the hardware device. At block 802, the interpreter looks up a first table to determine a list of actions needs to be taken. The first table may include a plurality of entries and each of the entry is corresponding to an action being taken on the hardware. It is appreciated that the first table is platform independent. At block 803, the interpreter retrieves an entry of the first table, the entry pointing to a second table containing a list of items need to be performed corresponding to the action. At block 804, the interpreter retrieves the item information from the second table and, at block 805 instructs a function to program the hardware based on the information retrieved from the second table. It is important to note that the function is hardware independent. These processes continue until no more actions left at block 806.

Figure 9:
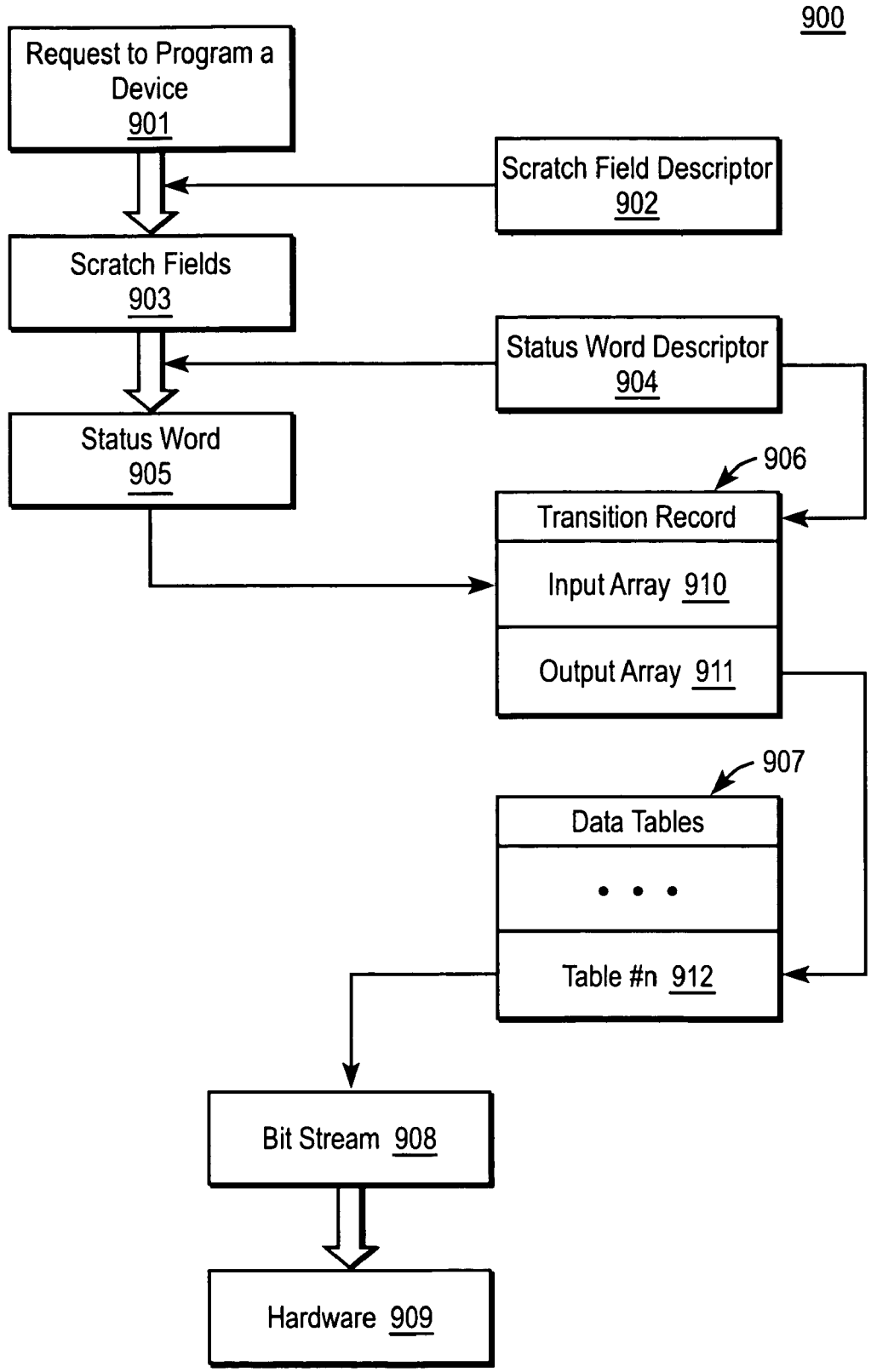
FIG. 9 shows a block diagram illustrating an exemplary method of processing a request for programming a device in accordance with an embodiment of the invention.

FIG. 9 shows a block diagram of processing a request for programming a device according to one embodiment of the invention. Referring to FIG. 9, when a request 901 is received, the system sets corresponding scratch fields using a scratch field descriptor 902, based on the request 901. The system then combines the scratch fields 903 and the status word descriptor 904 to create an actual status word 905. The actual status word 905 is then used to look up a transition record 906 linked with the status word descriptor 904. In one embodiment, the transition record 906 includes an input array 910 and an output array 911. Each of the output array 911 is related to each of the input array 910. The actual status word 905 is then matched with each of the input array 910. If a matched entry is found, the corresponding output item of the output array 911 will be retrieved. The entry includes an index pointing to a data table 912 of the array of data tables 907. The data of the data table 912 is then used to create a bit stream 908, which in turn used to program the hardware 909.

If the actual status word 905 is not found in the input array 910 of the transition record 906, a default transition (not shown) indicated in the transition record may be fetched to create the bit stream 908, which is used to program the hardware 909.

Figure 10:
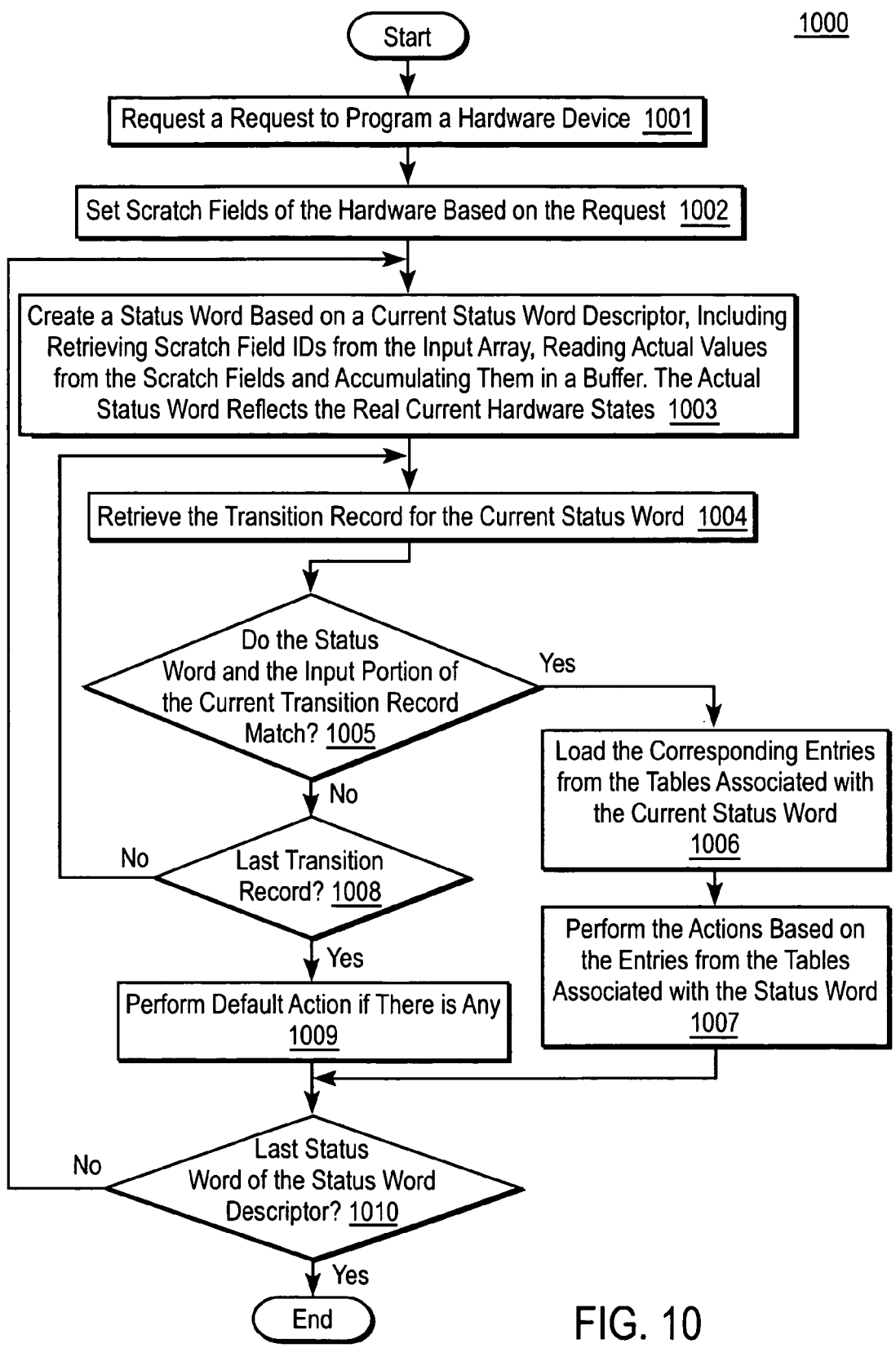
FIG. 10 shows a flowchart illustrating an exemplary method of processing a request for programming a device in accordance with yet another alternative embodiment of the invention.

FIG. 10 shows a flowchart illustrating an exemplary method of processing a request for programming a device according yet another alternative embodiment of the invention. When the system (e.g., the host module) receives a request to program a hardware device at block 1001, the host module sets scratch fields of the hardware based on the request, at block 1002. At block 1003, the system creates a status word based on a current status word descriptor, including retrieving scratch fields Ids from the input array, reading actual values from the scratch fields, and accumulating them in a temporary buffer. The actual status word reflects the real current hardware states. At block 1004, a transition record of the current status word is retrieved. The status word is then, at block 1005, compared with the input portion (e.g., input combination array) of the current transition record. If the status word is matched with one of the input array of the transition record, the corresponding entries are loaded from the data tables associated with the current status word, at block 1006. Thereafter, at block 1007, the system performs the actions based on the entries retrieved from the data tables associated with the status word. These processes continue until the last transition record is reached at block 1008. If the corresponding status word is not found in the transition record, the system will perform a default action indicated by the transition record at block 1009. The above processes continue until all of the status words listed by the status word descriptor have been processed, at block 1010.

Figure 11:
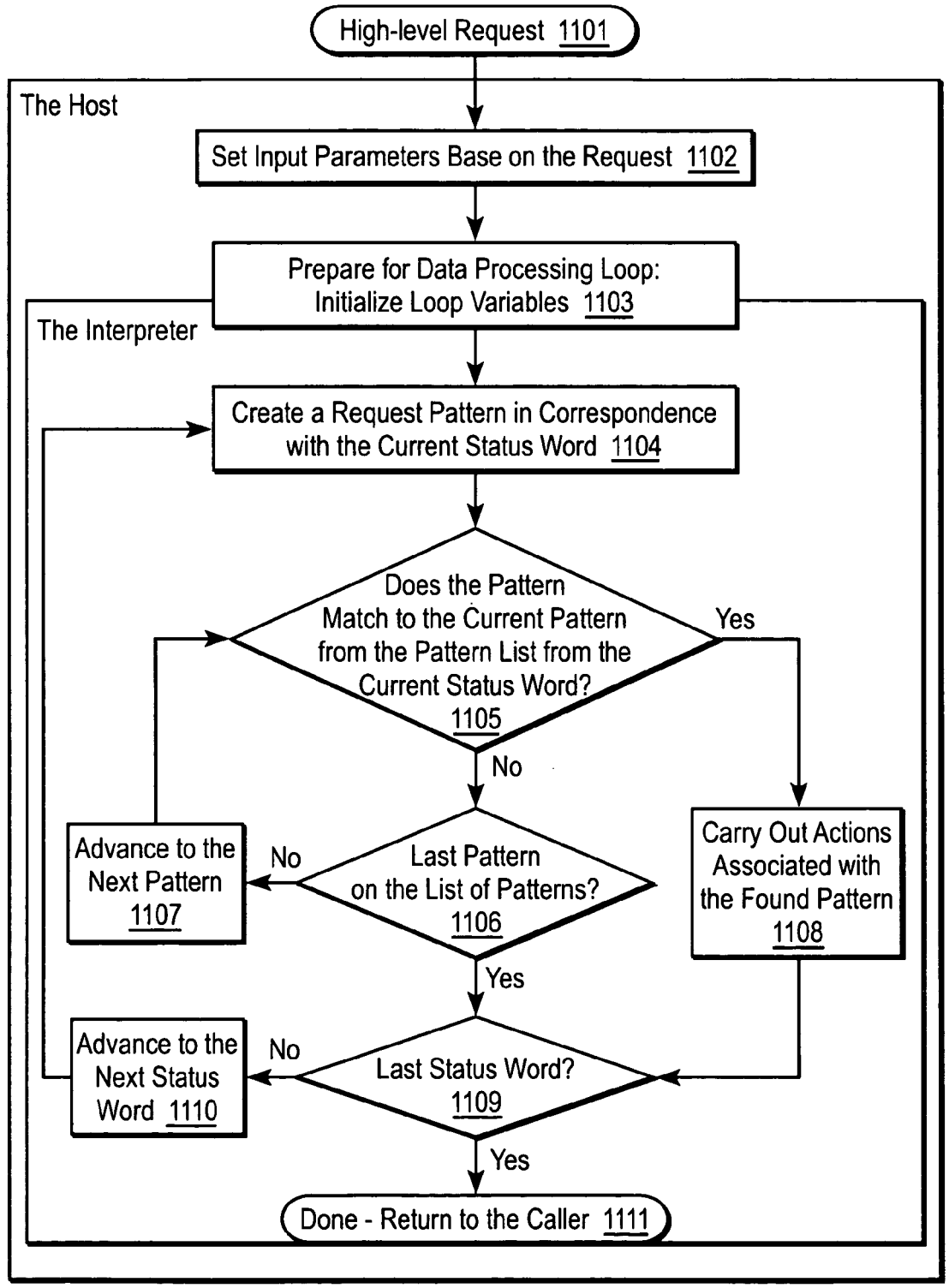
FIG. 11 shows a flowchart illustrating an exemplary method of processing a request for programming a device in accordance with an embodiment of the invention.

FIG. 11 shows a flowchart illustrating an exemplary method for processing a request to program a device in a data processing system having an operating system (OS) executed therein according to one embodiment of the invention. The request might be originated either from the OS or from an application. The Host module (for example device driver) receives the request and conducts some preprocessing, which might include initializing input variables used by the table-driven system. As an example there might be a video device driver initializing variables such as mode size, color depth, refresh rate and so on for a request to change current display mode.

After the initialization is complete, the Interpreter is called, which on the shown example is embedded in the driver's body. The interpreter's task is to go through every defined Status Word and through all the transition tables defined for Status Words, find entries in transition tables that match the current Hardware State and execute actions associated with them. For every Status Word the Interpreter creates a compatible Hardware Status Word and then scans through the transition table to find a match to the created pattern. Every time a match is found, the interpreter executes a special function called Table Loader, which in its turn would carry out necessary actions as specified by the TDBS. After the Table Loader returns control to the Interpreter, current Status Word is considered executed, and the Interpreter proceeds to the next one.

Referring to FIG. 11, when the request is received at block 1101, the host module, such as host module 351 of FIG. 3C initializes the request including setting up input parameters based on the request, at block 1102. Next, at block 1103, the interpreter, such as interpreter 354 of FIG. 3C, is invoked to prepare and initialize the data processing loop. At block 1104, the interpreter creates a request pattern in correspondence with the current status word. The pattern is then compared, at block 1105, with the current pattern from the pattern list of the current status word. If the pattern is found in the list, at block 1108, an action associated with the pattern found is carried out. If the pattern is not found in the list, at block 1107, the interpreter will search based on the next pattern available, until no more patterns available for the current status word at block 1106. The above actions are processed until no more status word left to be processed at block 1109.

Figure 12:
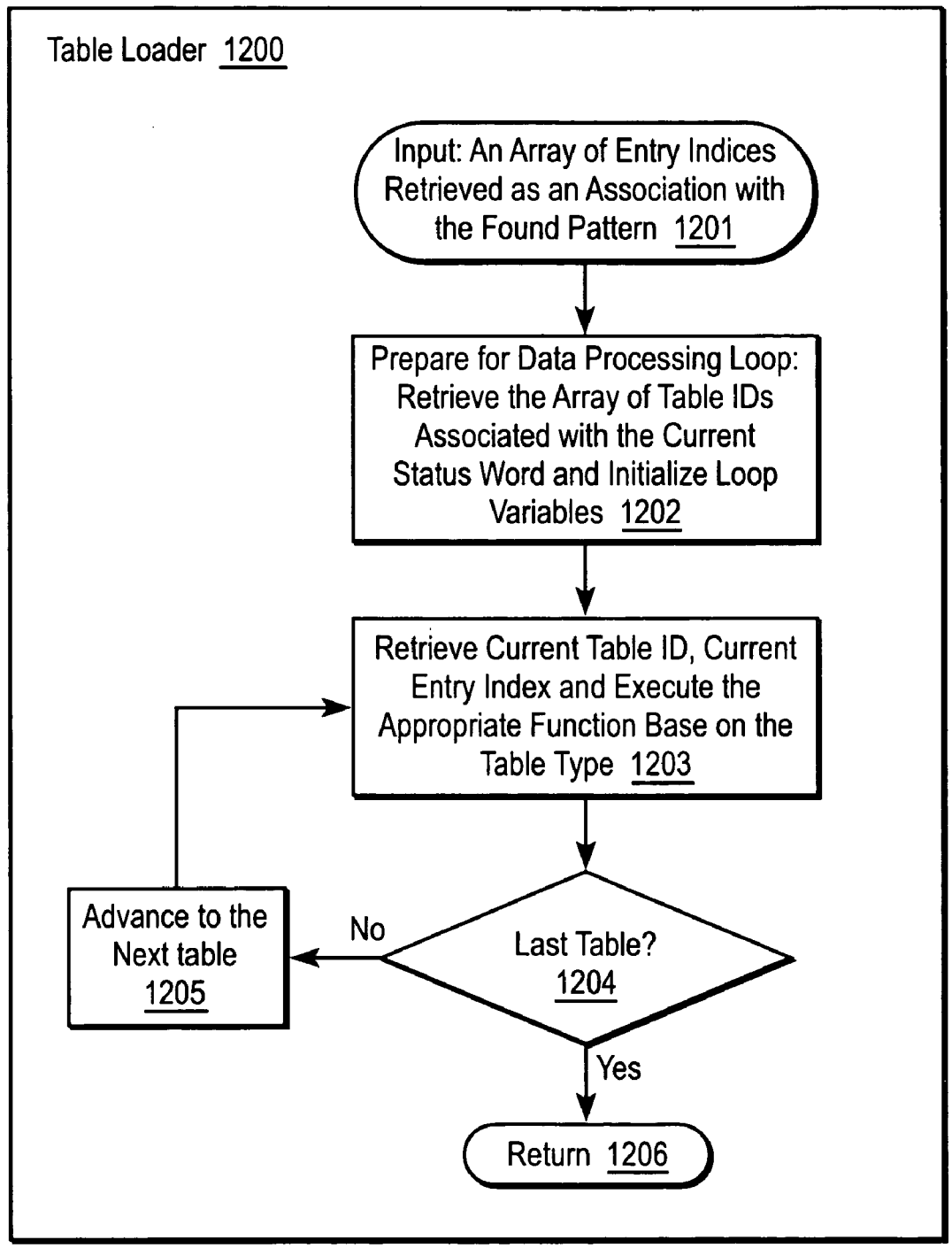
FIG. 12 shows a flowchart illustrating an exemplary method of loading and executing data tables in accordance with an embodiment of the invention.

FIG. 12 shows a flowchart illustrating an exemplary method for loading data tables in accordance with an aspect of the invention. In one embodiment, every time a match between a transition table entry and current Hardware State is found, Table Loader is called. Matched transition entry provides the Table Loader with an array of data table entry indices, and the current Status Word provides an array of data table IDs associated with the Status Word. By having the array of IDs the Table Loader knows what tables need to be used, and by having the array of indices, the Table Loader knows which entry for every table it needs to load.

Referring to FIG. 12, when a match between a transition table entry and current hardware state is found, at block 1201, the table loader 1200 retrieves an array of entry indices associated with the pattern found in the operation 1105 of FIG. 11. The table loader then retrieves the array of table IDs associated with the current status word and initialize loop variables at block 1202. Next, at block 1203, the current table ID and current entry index are retrieved and the appropriate function is carried out based on the table type. The above processes continue, at block 1204, until no more tables left to be processed.

FIG. 13 shows an exemplary image of a TDBS according to one embodiment of the invention. In one embodiment, the TDBS image includes a header shown in FIG. 14, an array of register type descriptors shown in FIG. 15, an array of scratch field descriptors shown in FIG. 16, an array of POST actions shown in FIG. 17, array of data table descriptors shown in FIG. 18 linked with a plurality of data tables (e.g., T0–T4), shown in FIGS. 19 to 23, each of the table includes fixed length header, variable length header, and data body. The TDBS image on FIG. 13 also includes an array of status word descriptors shown in FIG. 24, and their bitmaps and bit streams shown in FIGS. 25 to 26.

It will be appreciated that that more or fewer processes may be incorporated into the methods illustrated in the Figures without departing from the scope of the invention and that no particular order is implied by the arrangement of blocks shown and described herein. It further will be appreciated that the processes described in conjunction with Figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for processing a request to program a device in a data processing system having an operating system (OS) executed therein, the method comprising:
    initializing the device based on a list of actions maintained by at least one table, the list of actions being independent of the OS and the device;
    indexing the request to a data structure containing information cross-referencing the list of actions associated with the request, the data structure linking with the at least one table having data information related to the list of actions, the at least one table being independent of the OS and the device;
    looking up at least one table to retrieve the data information related to the list of actions; and
    instructing a function to program the device based on the data information retrieved from the at least one table, operation of the function being independent of the device.

2. The method of claim 1, wherein the request is received through an interrupt generated from the device.

3. The method of claim 1, wherein the request is received through a user interface.

4. The method of claim 1, further comprising:
    interpreting the data information retrieved from the at least one table; and
    generating an instruction stream based on the interpretation, the instruction stream representing the list of actions the function carries out.

5. The method of claim 1, further comprising:
    determining a set of hardware registers that need to be programmed;
    looking up a first table to determine a list of actions based on the determined hardware registers;
    searching a transition based on the list of actions in a second table pointed by the first table, the transition including data and hardware registers location information; and
    performing the transition based on the information retrieved from the second table.

6. The method of claim 5, wherein if the transition is not found in the second table, the method further comprises:
    determining whether there is a default action corresponding to the set of hardware registers; and
    performing the default action if there is a default action indicated by the second table.

7. A method for processing a request to program a device in a data processing system having an operating system (OS) executed therein, the method comprising:
    indexing the request to a data structure containing information cross-referencing a list of actions associated with the request, the data structure linking with at least one table having data information related to the list of actions, the at least one table being independent of the OS and the device;
    looking up at least one table to retrieve the data information related to the list of actions;
    interpreting the data information retrieved from the at least one table;
    generating an instruction stream based on the interpretation, the instruction stream representing the list of actions a function carries out; and
    instructing a function to program the device based on the instruction stream, operation of the function being independent of the device, wherein each action of the instruction stream comprises:
        a device register type;
        a device register index; and
        a data value being programmed to a device register identified by the device register type and device register index.

8. A method for processing a request to program a device in a data processing system having an operating system (OS) executed therein, the method comprising:
    indexing the request to a data structure containing information cross-referencing a list of actions associated with the request, the data structure linking with at least one table having data information related to the list of actions, the at least one table being independent of the OS and the device;
    looking up at least one table to retrieve the data information related to the list of actions;
    interpreting the data information retrieved from the at least one table;
    generating an instruction stream based on the interpretation, the instruction stream representing the list of actions a function carries out; and
    instructing a function to program the device based on the instruction stream, operation of the function being independent of the device, wherein the instruction stream comprises pseudo codes to be executed to carry out a specific operation, the pseudo codes being independent of the OS and the device.

9. A method for processing a request to program a device in a data processing system having an operating system (OS) executed therein, the method comprising:

indexing the request to a data structure containing information cross-referencing a list of actions associated with the request, the data structure linking with at least one table having data information related to the list of actions, the at least one table being independent of the OS and the device;

looking up at least one table to retrieve the data information related to the list of actions; and instructing a function to program the device based on the data information retrieved from the at least one table, operation of the function being independent of the device, wherein the at least one table comprises at least one of the following tables:

a register type table for defining types of the device registers;

a power-on self test (POST) action table for defining sequences of action taken during an initialization;

an array of scratch field tables having a plurality of scratch fields to store inputted values;

an array of data tables; and an array of status word tables, each having a transition record linking with at least one data tables corresponding to the scratch fields of determined by a scratch field table.

10. The method of claim 9, further comprising:

determining a set of hardware registers that need to be programmed using the array of scratch field tables;

searching for a corresponding transition in the transition record based on the set of hardware registers; and performing the corresponding transition to the hardware registers based on information retrieved from the transition record.

11. The method of claim 10, further comprising performing a default transition if the corresponding transition is not found in the transition record.

12. An apparatus for processing a request to program a device in a data processing system having an operating system (OS) executed therein, the apparatus comprising:

a data structure indexed by the request operable to provide information cross-referencing a list of actions associated with the request;

at least one table linked with the data structure, the at least one table having data information related to the list of actions, the at least one table being independent of the OS and the device; and a function operable to program the device based on the data information retrieved from the at least one table, operation of the function being independent of the device, wherein the data structure and the at least one table are loaded and unloaded dynamically.

13. The apparatus of claim 12, further comprising a configuration unit operable to configure the data structure and the at least one table, the configuration unit providing an interface to allow a user to interact.

14. The apparatus of claim 12, further comprising an interpreter configured to interpret the data information retrieved from the at least one table and to instruct the function to carry out the operation.

15. The apparatus of claim 12, wherein the at least one table comprises a table selected from the group consisting of:

a register type table, the register type table defining types of the device registers;

a power-on self test (POST) action table, the POST action table defining sequences of action taken during an initialization;

an array of scratch field tables, the array of scratch field tables having a plurality of scratch fields to store inputted values;

an array of data tables; and an array of status tables.

16. A tangible machine-readable medium having executable code to cause a machine to perform a method for processing a request to program a device in a data processing system having an operating system (OS) executed therein, the method comprising:

initializing the device based on a list of actions maintained by at least one table, the list of actions being independent of the OS and the device;

indexing the request to a data structure containing information cross-referencing the list of actions associated with the request, the data structure linking with the at least one table having data information related to the list of actions, the at least one table being independent of the OS and the device;

looking up the at least one table to retrieve the data information related to the list of actions; and instructing a function to program the device based on the data information retrieved from the at least one table, operation of the function being independent of the device.

17. The machine-readable medium of claim 16, wherein the method further comprises:

interpreting the data information retrieved from the at least one table; and generating an instruction stream based on the interpretation, the instruction stream representing the list of actions the function carries out.

18. The machine-readable medium of claim 16, wherein the method further comprises:

determining a set of hardware registers that need to be programmed;

looking up a first table to determine a list of actions based on the determined hardware registers;

searching a transition based on the list of actions in a second table pointed by the first table, the transition including data and hardware register locations information; and performing the transition based on the information retrieved from the second table.

19. The machine-readable medium of claim 18, wherein if the transition is not found in the second table, the method further comprises:

determining whether there is a default action corresponding to the set of hardware registers; and performing the default action if there is a default action indicated by the second table.

20. A data processing system, comprising:

at least one processor; and a memory coupled to the at least one processor, the memory having an operating system (OS) executed therein and the memory storing instructions, which when executed by the at least one processor, cause the at least one processor to perform the operations of:

initializing a device based on a list of actions maintained by at least one table, the list of actions being independent of the OS and the device;

indexing the request to a data structure containing information cross-referencing the list of actions associated with a request, the data structure linking with the at least one table having data information related to the list of actions, the at least one table being independent of the OS and the device being programmed;

looking up the at least one table to retrieve the data information related to the list of actions; and instructing a function to program the device based on the data information retrieved from the at least one table, operation of the function being independent of the device.

* * * * *